United States Patent
Shiraki

(10) Patent No.: US 10,156,632 B2
(45) Date of Patent: Dec. 18, 2018

(54) DETECTION APPARATUS, UNDERWATER DETECTION APPARATUS, RADAR APPARATUS, AND DETECTION METHOD

(71) Applicant: FURUNO ELECTRIC CO., LTD., Nishinomiya, Hyogo (JP)

(72) Inventor: Rika Shiraki, Amagasaki (JP)

(73) Assignee: FURUNO ELECTRIC COMPANY LIMITED, Nishinomiya (JP)

(*) Notice: Subject to any disclaimer, the term of this patent is extended or adjusted under 35 U.S.C. 154(b) by 323 days.

(21) Appl. No.: 15/160,732

(22) Filed: May 20, 2016

(65) Prior Publication Data

US 2017/0097415 A1 Apr. 6, 2017

(30) Foreign Application Priority Data

Oct. 6, 2015 (EP) ..................... 15188493

(51) Int. Cl.
*G01S 13/88* (2006.01)
*G01S 15/96* (2006.01)
(Continued)

(52) U.S. Cl.
CPC ............ *G01S 13/88* (2013.01); *G01S 15/108* (2013.01); *G01S 15/96* (2013.01); *G01S 13/28* (2013.01); *G01S 13/30* (2013.01)

(58) Field of Classification Search
CPC .... G01S 15/96; G01S 15/104; G01S 7/52004; G01S 7/524; G01S 15/108; G01S 7/539; G01S 7/62; G01S 7/6263
(Continued)

(56) References Cited

U.S. PATENT DOCUMENTS 5,561,641 A * 10/1996 Nishimori ................ G01S 3/80
 367/110
7,039,505 B1 * 5/2006 Southard ................ G01S 7/003
 701/3
(Continued)

FOREIGN PATENT DOCUMENTS

EP  2518528 A2  10/2012
JP  05-196733 A  8/1993
(Continued)

OTHER PUBLICATIONS

Myounghee Kang et al., Effective and accurate use of difference in mean volume backscattering strength to identify fish and plankton, ICES Journal of Marine Science, Aug. 1, 2002, p. 794-804, vol. 59, No. 4, Elsevier Science Ltd.
(Continued)

*Primary Examiner* — Timothy Pham
(74) *Attorney, Agent, or Firm* — Studebaker & Brackett PC

(57) ABSTRACT

A detection apparatus is provided. The detection apparatus includes a hardware processor programmed to at least calculate a first echo intensity of a first reception signal generated from a reception wave reflected on a reflection object, calculate a second echo intensity of a second reception signal generated from a reception wave reflected on the reflection object, a signal duration of the second reception signal being shorter than that of the first reception signal, and detect a target from a comparison of the first echo intensity and the second echo intensity.

15 Claims, 19 Drawing Sheets

(51) Int. Cl.
*G01S 15/10* (2006.01)
*G01S 13/28* (2006.01)
*G01S 13/30* (2006.01)

(58) Field of Classification Search
USPC .......................................................... 342/22
See application file for complete search history.

(56) References Cited

U.S. PATENT DOCUMENTS

| | | |
|---|---|---|
| 2008/0080317 A1 | 4/2008 | Inouchi et al. |
| 2012/0139773 A1 | 6/2012 | Misonoo et al. |
| 2012/0263018 A1* | 10/2012 | Yamaguchi ............. G01S 7/524 367/88 |
| 2014/0355385 A1* | 12/2014 | Inagaki .................. G01S 15/02 367/99 |

FOREIGN PATENT DOCUMENTS

| | | |
|---|---|---|
| JP | 05-223936 A | 9/1993 |
| JP | 08-101271 A | 4/1996 |

OTHER PUBLICATIONS

Extended European Search Report of the corresponding European Patent Application No. 15188493.9, dated Apr. 7, 2016.

\* cited by examiner

DETECTION APPARATUS, UNDERWATER DETECTION APPARATUS, RADAR APPARATUS, AND DETECTION METHOD

CROSS-REFERENCE TO RELATED APPLICATION(S)

This application claims priority under 35 U.S.C. § 119 to European Patent Application No. EP 15188493.9, which was filed on Oct. 6, 2015, the entire disclosure of which is hereby incorporated by reference.

TECHNICAL FIELD

The present disclosure relates to a detection apparatus, an underwater detection apparatus, a radar apparatus and a detection method for determining whether a reception wave received from a target is from a target of interest.

BACKGROUND

Conventional detection apparatus (for example the detection apparatus disclosed in U.S. patent application publication number 2008/0080317) determines whether a reception wave is from a single fish based on rising and falling edges of a waveform of the reception wave.

SUMMARY (1) In one aspect of the present disclosure, a detection apparatus is provided. The detection apparatus includes a hardware processor programmed to at least calculate a first echo intensity of a first reception signal generated from a reception wave reflected on a reflection object, calculate a second echo intensity of a second reception signal generated from a reception wave reflected on the reflection object, a signal duration of the second reception signal being shorter than that of the first reception signal, and detect a target from a comparison of the first echo intensity and the second echo intensity.

(2) The detection apparatus may further include a transducer configured to transmit a transmission wave. The hardware processor may be further programmed to at least compress the first reception signal generated from the reception wave resulting from a reflection of the transmission wave on the reflection object to generate the second reception signal, and calculate the second echo intensity from the second reception signal.

(3) The detection apparatus may further include a transducer configured to transmit a first transmission wave and a second transmission wave, a pulse width of the second transmission wave being shorter than that of the first transmission wave. The hardware processor may be further programmed to at least calculate the first echo intensity based on a reception wave resulting from a reflection of the first transmission wave on the reflection object, and calculate the second echo intensity based on a reception wave resulting from a reflection of the second transmission wave on the reflection object.

(4) The hardware processor may be further programmed to at least detect the target on a condition that the second echo intensity is bigger than the first echo intensity.

(5) The hardware processor may be further programmed to at least detect the target on a condition that the second echo intensity is bigger than the first echo intensity by at least a given value.

(6) The hardware processor may be further programmed to at least calculate the first echo intensity by compensating for a beam width in which the transmission wave is transmitted by the transducer, and calculate the second echo intensity by compensating for the beam width.

(7) The hardware processor may be further programmed to at least calculate the first echo intensity by compensating for a beam width in which the first transmission wave is transmitted by the transducer, and calculate the second echo intensity by compensating for a beam width in which the second transmission wave is transmitted by the transducer.

(8) The hardware processor may be further programmed to at least calculate the first echo intensity by compensating for the duration of the first reception signal, and calculate the second echo intensity by compensating for the duration of the second reception signal.

(9) The hardware processor may be further programmed to at least calculate volume backscattering strength of the first reception signal as the first echo intensity, and calculate volume backscattering strength of the second reception signal as the second echo intensity.

(10) The hardware processor may be further programmed to at least reduce a high frequency component of the first echo intensity, and compare the first echo intensity from which high frequency component is reduced and the second echo intensity.

(11) The hardware processor may be further programmed to at least reduce the high frequency component of the first echo intensity by performing a moving average of the first echo intensity.

(12) The hardware processor may be further programmed to at least reduce a high frequency component of the first echo intensity, reduce a high frequency component of the second echo intensity, and evaluate a validity of the target detection based on a ratio of the first echo intensity from which high frequency component is reduced and the second echo intensity from which high frequency component is reduced.

(13) In another aspect of the present disclosure, a detection apparatus is provided. The detection apparatus includes a transducer and a hardware processor. The transducer is configured to transmit a first transmission wave and a second transmission wave, a beam width of the second transmission wave being smaller than that of the first transmission wave. The hardware processor is programmed to at least calculate a first echo intensity of a first reception signal generated from a reception wave resulting from a reflection of the first transmission wave on a reflection object, calculate a second echo intensity of a second reception signal generated from a reception wave resulting from a reflection of the second transmission wave on the reflection object, and detect a target from a comparison of the first echo intensity and the second echo intensity.

(14) The hardware processor may be further programmed to at least calculate the first echo intensity by compensating for the beam width of the first transmission wave, and calculate the second echo intensity by compensating for the beam width of the second transmission wave.

(15) The hardware processor may be further programmed to at least calculate the first echo intensity by compensating for a duration of the first reception signal, and calculate the second echo intensity by compensating for a duration of the second reception signal.

(16) In another aspect of the present disclosure, an underwater detection apparatus is provided. The underwater detection apparatus includes any of the detection apparatus described above. The target may be at least one of a fish school, a single fish or a single aquatic species

(17) The hardware processor may be further programmed to at least detect a single fish or a single aquatic species as a single target, and calculate a size of the single target.

(18) In another aspect of the present disclosure, a radar apparatus is provided. The radar apparatus includes any of the detection apparatus described above.

(19) Another aspect of the present disclosure is to provide a detection method that comprises calculating a first echo intensity of a first reception signal generated from a reception wave reflected on a reflection object, calculating a second echo intensity of a second reception signal generated from a reception wave reflected on the reflection object, a signal duration of the second reception signal being shorter than that of the first reception signal, and detecting a target from a comparison of the first echo intensity and the second echo intensity.

Accordingly, the present disclosure can accurately detect a target.

BRIEF DESCRIPTION OF THE DRAWINGS

The present disclosure is illustrated by way of example and not by way of limitation in the figures of the accompanying drawings, in which the like reference numerals indicate like elements and in which:

FIG. 12A shows the waveform before high frequency component reduction processing and FIG. 12B shows the waveform after high frequency component reduction processing;

FIG. 13A shows the waveform before high frequency component reduction processing and FIG. 13B shows the waveform after high frequency component reduction processing;

DETAILED DESCRIPTION

With a conventional detection apparatus as explained above, when for example several targets are closely separated in distance, the rising and falling edges of the waveforms of each target overlap. As a result, as the characteristic of the rising and falling edges of the waveforms is altered, it is not possible to accurately determine if each waveform is from a target of interest.

Certain embodiments of this disclosure relates to more accurately detecting a target.

Figure 1:
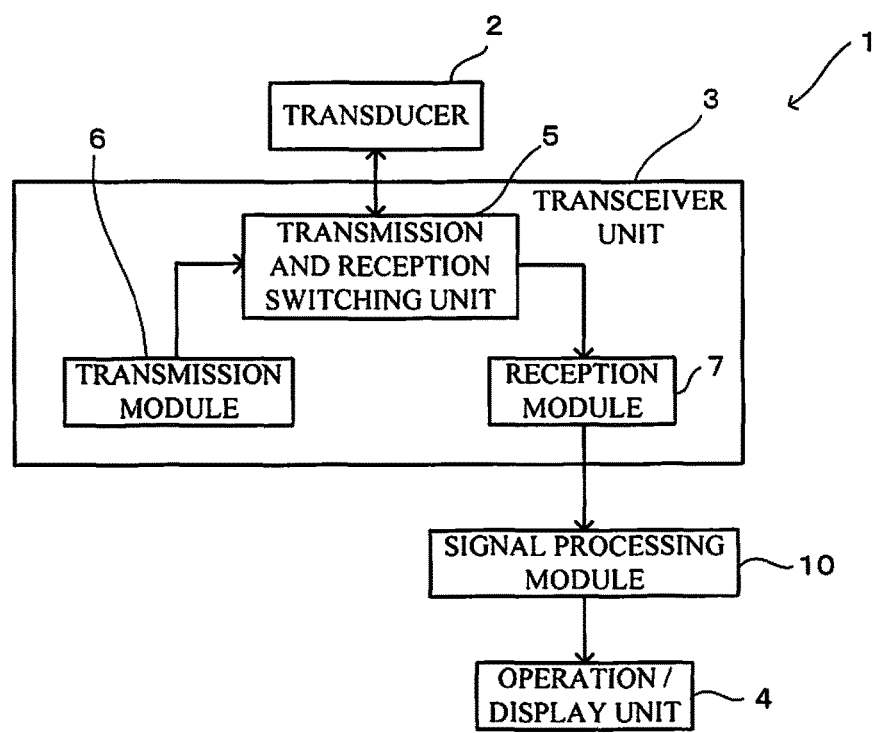
FIG. 1 shows a block diagram of an arrangement of a fish finder, according to an embodiment of the present disclosure.

FIG. 1 shows a block diagram of an arrangement of a fish finder 1 (as a detection apparatus or as an underwater detection apparatus) according to one embodiment of the present disclosure. Hereinafter, there will be explained, referring to the drawings, fish finder 1 according to one embodiment of the present disclosure. Fish finder 1 shown in FIG. 1 is arranged to estimate the number of fish within a detection area in water. Fish finder 1 is for example installed on a ship such as a fishing vessel. Note that, hereinafter, fish finder 1 uses single fish as an example of target of interest but other single aquatic species may also be used as target of interest.

As shown in FIG. 1, fish finder 1 comprises a transducer 2, a transceiver unit 3, a signal processing module 10 and an operation/display unit 4.

Transducer 2 may transform electrical signal into ultrasonic wave and transmit ultrasonic wave into the water, repeatedly at given timings (namely, at a given cycle). Transducer 2 may also transform received ultrasonic wave into electrical signal. A chirp wave whose frequency is gradually changing as time passes may be repeatedly transmitted at given timings and for a given duration from transducer 2 of the present embodiment.

The transceiver unit 3 is comprised of a transmission and reception switching unit 5, a transmission module 6, and a reception module 7. During transmission, the transmission and reception switching unit 5 may connect the transmission module 6 and transducer 2 to supply a transmission signal from the transmission module 6 to transducer 2. During reception, the transmission and reception switching unit 5 may connect transducer 2 and reception module 7 so that reception wave transformed into electrical signal by transducer 2 is supplied to the reception module 7.

The transmission module 6 may generate a transmission signal based on the conditions set via the operation/display unit 4 and supply the transmission signal to transducer 2 via the transmission and reception switching unit 5. In order to have a chirp wave transmitted from transducer 2 as explained above, the transmission module 6 of the present embodiment may supply a chirp signal to transducer 2 as the source of said chirp wave.

The reception module 7 may amplify the electrical signal supplied from transducer 2 and perform an Analog to Digital conversion of the amplified reception signal. The reception module 7 may then supply the converted digital reception signal to the signal processing module 10.

The signal processing module 10 may process the reception signal outputted by the reception module 7 and generate a video signal of the target. With reference to the ship on which fish finder 1 is installed, the signal processing module 10 may also generate a frequency distribution graph that shows in a given area of water the number of fish of a given fish length. The arrangement of the signal processing module 10 will be explained in detail later.

Figure 2:
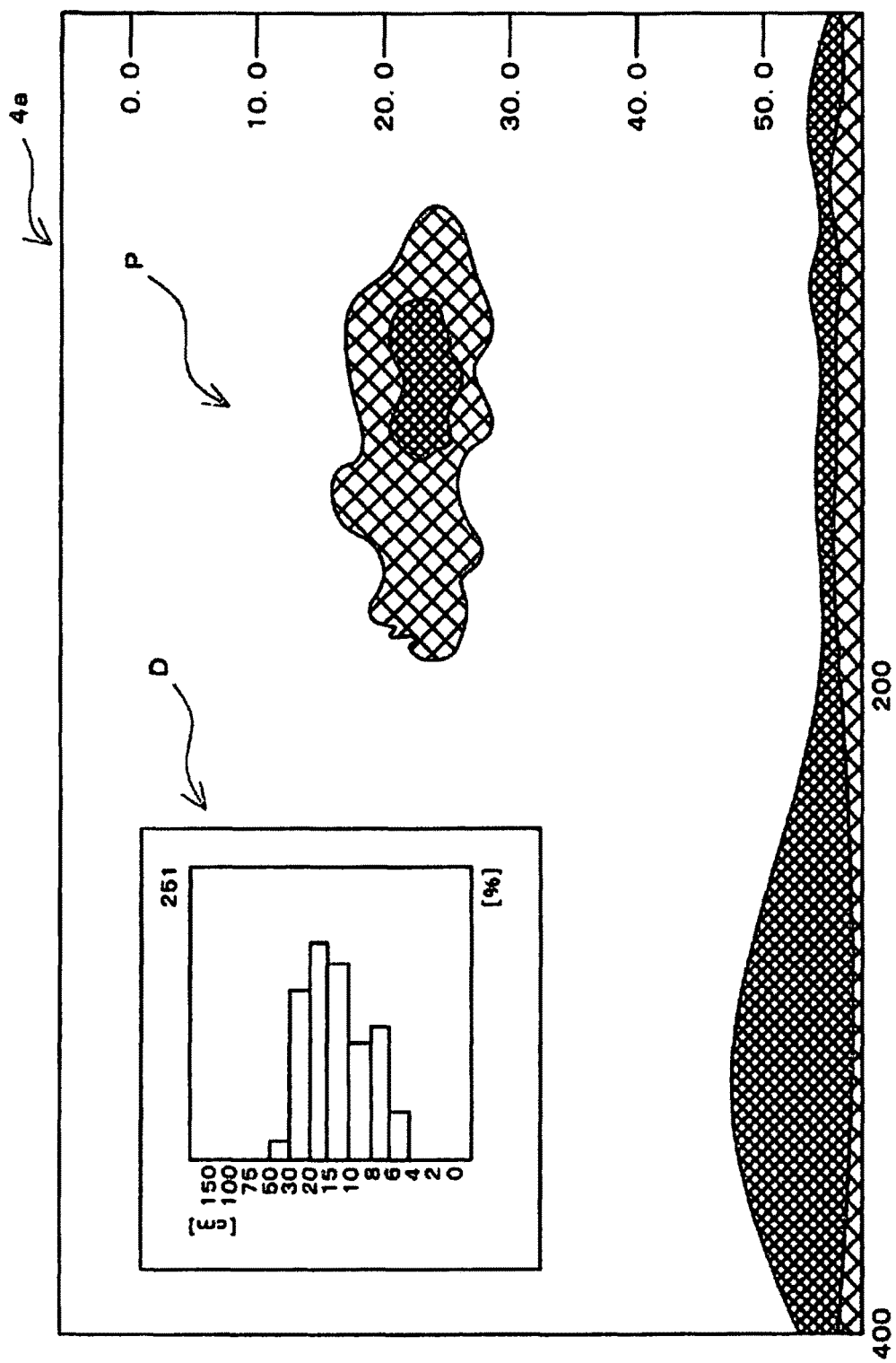
FIG. 2 shows schematically an example of a display screen of an operation/display unit of the fish finder shown in FIG. 1.

FIG. 2 shows schematically an example of a display screen 4a of the operation/display unit 4 of the fish finder 1 shown in FIG. 1. As shown in FIG. 2, the operation/display unit 4 may display on the display screen 4a an image P that corresponds to the video signal outputted by the signal processing module 10. By looking at image P on display screen 4a, a user can estimate a situation of the sea below the ship (for example presence or absence of fish, position of fish relative to own ship, etc). The operation/display unit 4 may also comprise a variety of input means such as input buttons so that various settings or parameters related to transmission and reception of ultrasonic wave, signal processing or image display can be inputted. The vertical axis of the display screen 4a shown in FIG. 2 corresponds to depth. Numerical values on the horizontal axis of display screen 4a shown in FIG. 2 represent ping numbers, one ping corresponding to one chirp wave transmission.

As shown in FIG. 2, the frequency distribution graph D generated by the signal processing module 10 may also be displayed on the display screen 4a of the operation/display unit 4. The number of fish detected as single fish may be represented in percentage for every fish length on the frequency distribution graph D. On the example shown in FIG. 2, the total number of fish detected is also displayed on the right-upper part of the frequency distribution graph D.

Figure 3:
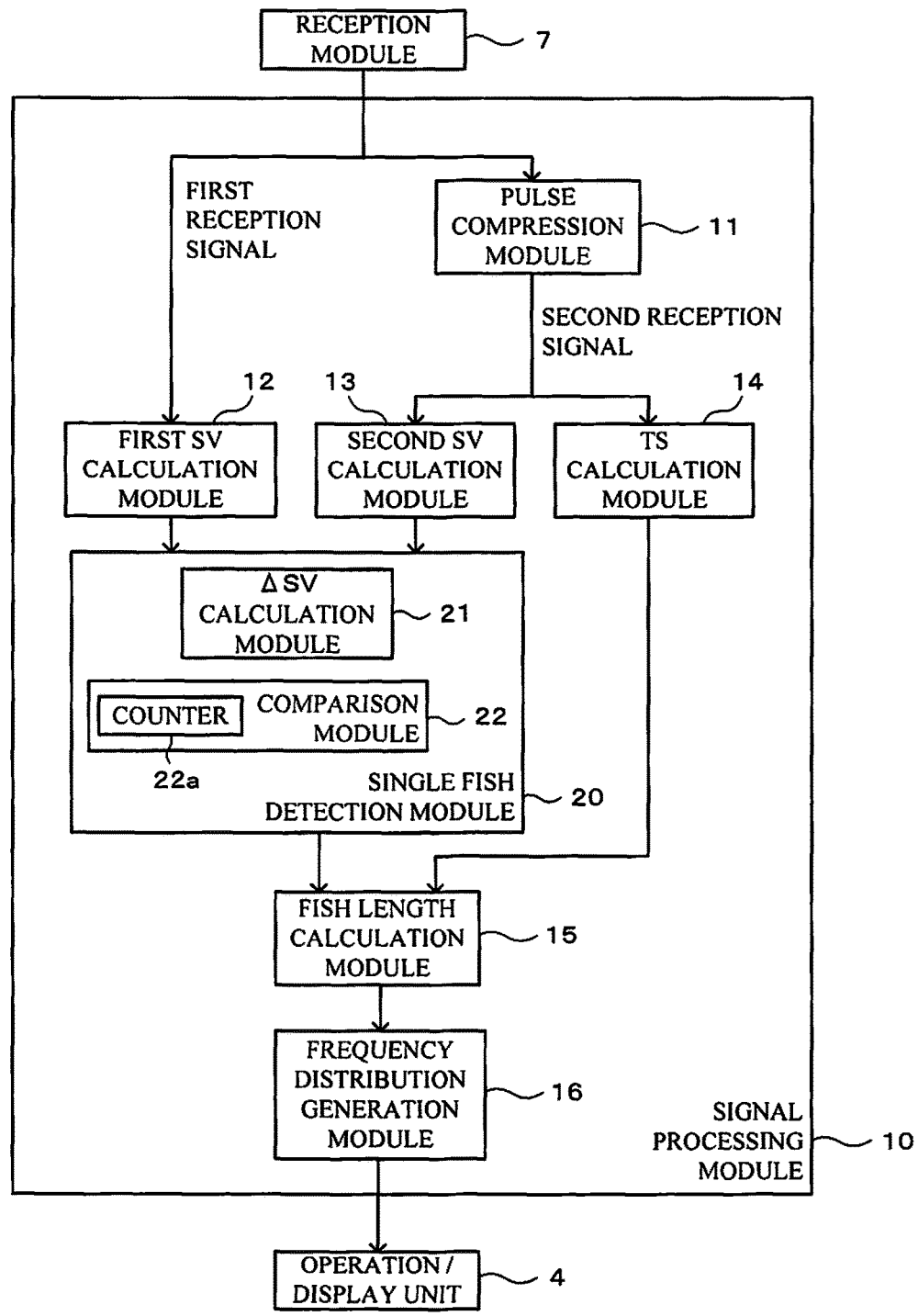
FIG. 3 shows a block diagram of an arrangement of a signal processing module of the fish finder shown in FIG. 1.

FIG. 3 shows a block diagram of an arrangement of the signal processing module 10 of fish finder 1 shown in FIG. 1. As shown in FIG. 3, the signal processing module 10 is comprised of a pulse compression module 11, a first SV calculation module 12, a second SV calculation module 13, a TS calculation module 14, a single fish detection module 20, a fish length calculation module 15, and a frequency distribution generation module 16. The signal processing module 10 is for example implemented on a hardware processor (for example CPU, FPGA) and a memory (not shown on the figures). For example, by having the hardware processor read a program from the memory and execute the program, it is possible to implement the functions of the pulse compression module 11, the first SV calculation module 12, the second SV calculation module 13, the TS calculation module 14, the single fish detection module 20, the fish length calculation module 15, and the frequency distribution generation module 16.

The pulse compression module 11 may perform a pulse compression of the reception signal (which may also be referred to as the first reception signal) outputted by the reception module 7. Specifically, the pulse compression module 11 uses for example a matched filter (not shown). The matched filter correlates the reception signal acquired from the reception wave received by transducer 2 and a reference signal set in advance based on a transmission wave (for example a chirp wave) to perform pulse compression of the reception signal. As a result, the duration of the reception signal in the depth direction is shortened and a second reception signal is generated.

The first SV calculation module 12 may calculate as echo intensity (which may also be referred to as first echo intensity) the volume backscattering strength (which may also be referred to as the SV value) based on the reception signal (which may also be referred to as the first reception signal) outputted by the reception module 7. SV value can be expressed with the following equation (1) and the first SV calculation module 12 calculates SV value for each position along the depth. Note that, hereinafter, the SV value calculated by the first SV calculation module 12 may be called first SV value.

$$SV = EL - SL - ME + Cb + Cd \quad (1)$$

In the above equation (1), EL is a received voltage of the echo signal (EL unit is dB with reference set to 1V), SL is a source level of the ultrasound transmission wave (SL unit is dB with reference set to 1 µPa), and ME is a wave-receiving sensitivity of the transducer (ME unit is dB with reference to 1V/µPa).

Cb ($=-10 \log(c\tau/2) - 20 \log(\theta) + 31.6$) is a correction term based on the characteristics of an ultrasound beam and Cd ($=20 \log(r) + 2\alpha r/1000$) is a correction term relating to attenuation in distance direction (which may also be referred to as depth direction). Here, c is a speed of sound (expressed in m/s), $\tau$ is a length (which may also be referred to as a duration and is expressed in s) of the reception signal (specifically, a length $\tau_1$ of the first reception signal and a length $\tau_2$ of the second reception signal), $\theta$ is a half angle (which may also be referred to as a half beam width) of the transmission beam (expressed in deg), r is a distance to a target (expressed in m) and $\alpha$ is an underwater absorption loss coefficient (expressed in dB/km). Specifically, as an approximation, the length $\tau_1$ of the first reception signal is set to a duration (which may also be referred to as a pulse width) of the transmission signal (for example the chirp signal) generated by the transmission module 6.

The second SV calculation module 13 may calculate as echo intensity (which may also be referred to as second echo intensity) the SV value using the above equation (1) based on the reception signal (which may also be referred to as the second reception signal) pulse compressed by the pulse compression module 11. The second SV calculation module 13 may also calculate SV value for each position along the depth, as performed by the first SV calculation module 12. Note that, hereinafter, the SV value calculated by the second SV calculation module 13 may be called second SV value. Specifically, as an approximation, the length $\tau_2$ of the second reflection signal in equation (1) is set to the duration the chirp signal generated by the transmission module 6 would have after being compressed by the pulse compression module 11. This can be calculated theoretically.

Figure 4:
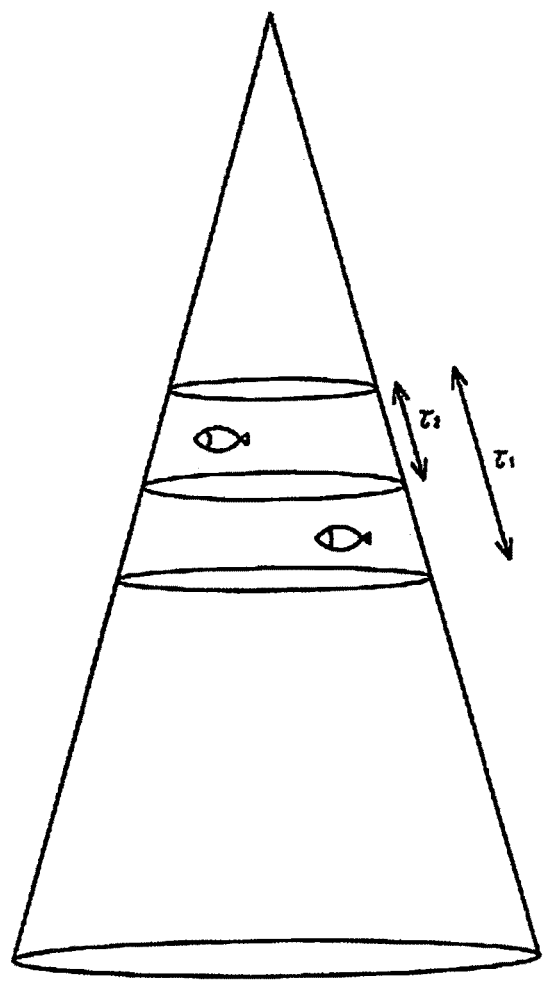
FIG. 4 shows schematically an example of relative position in the sea of a plurality of fish detected by the fish finder and a shape of a beam formed by a transducer.
Figure 5:
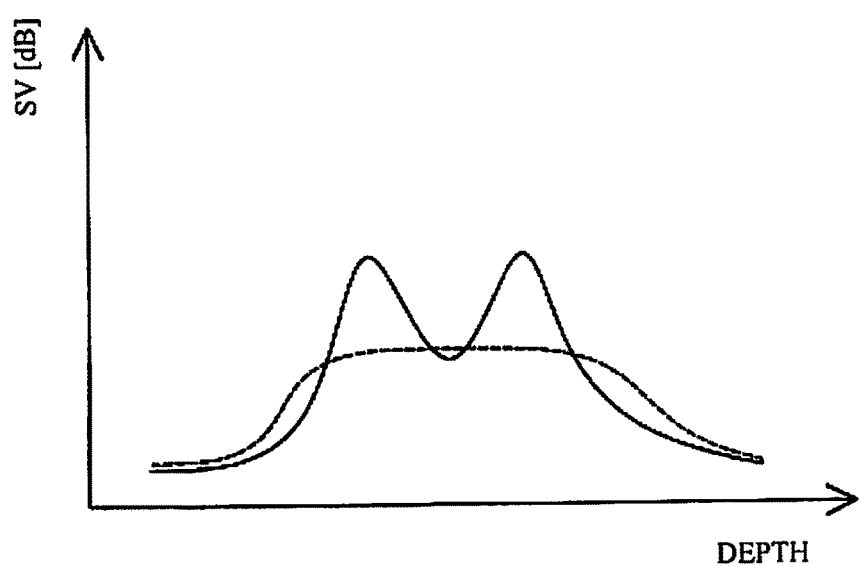
FIG. 5 shows an example of a first SV value graph and a second SV value graph, the dotted line being the first SV value graph and the solid line being the second SV value graph.

FIG. 4 shows schematically an example of relative position in the sea of a plurality of fish detected by fish finder 1 and a shape of the beam formed by transducer 2. FIG. 4 illustrates two fish relatively closely separated in the depth direction. FIG. 5 shows an example of a first SV value graph and a second SV value graph, the dotted line being the first SV value graph and the solid line being the second SV value graph. The first SV value graph shows a variation of the first SV value with depth, and the second SV value graph shows a variation of the second SV value with depth.

As explained above, the two fish of FIG. 4 are illustrated in a situation where they are relatively closely separated in the depth direction. In the second SV value graph, a resolution in the depth direction is relatively high as it is generated based on the pulse compressed reception signal (which may also be referred to as the second reception signal). However, there is resolution limitation; for example when the two fish are close, a portion of the peak waveform of each fish overlap. Specifically, on the example shown in FIG. 5, the falling edge portion of the left peak waveform overlaps the rising edge portion of the right peak waveform. In such situation, compared to the situation where both peaks are well separated, as the characteristics of the rising edge portion of the waveform and the falling edge portion of the waveform are altered, the two fish cannot be distinguished with a conventional method (for example the method disclosed in US2008/0080317 explained above). As a result, the number of single fish cannot be accurately estimated. With fish finder 1 according to the present embodiment, as explained below in detail in the single fish detection module 20, closely separated fish can each be detected as single fish.

The TS calculation module 14 may calculate for each ping and for each echo returning from each depth position an echo intensity, such as target strength (hereinafter also called TS value) for example.

The single fish detection module 20 may compare the first SV value calculated by the first SV calculation module 12 and the second SV value calculated by the second SV calculation module 13 and detect single fish (which may also be referred to as single target) according to the result of the comparison. As shown in FIG. 3, the single fish detection module 20 is comprised of a ΔSV calculation module 21 and a comparison module 22.

The ΔSV calculation module 21 may calculate for each depth position the difference between the first SV value and the second SV value (which may also be referred to as ΔSV value). Specifically, the ΔSV calculation module 21 may calculate the ΔSV value by subtracting the first SV value from the second SV value for each depth position. Note that in the present embodiment, the explanation is based on the first SV value and second SV value being expressed in logarithmic scale. In the case the first SV value and the second SV value are expressed in linear scale, the ΔSV calculation module 21 calculates the ratio of the first SV value and the second SV value for each depth position.

The comparison module 22 may compare the ΔSV value calculated by the ΔSV calculation module 21 with a given threshold Thr1 and determine whether the ΔSV value is above threshold Thr1. The comparison module 22 may also comprise a counter 22a to count a count value N of continuous positions where the ΔSV value is above threshold Thr1 in the depth direction. Then, the comparison module 22 may determine whether the count value N stored in counter 22a is above a lower limit value $N_{min}$ and below an upper limit value $N_{max}$. When the count value N is above the lower limit value $N_{min}$ and below the upper limit value $N_{max}$, the comparison module 22 may determine that the peak waveform is a waveform of a single fish and detect it as a single fish.

The fish length calculation module 15 may calculate fish length of single fish (which may also be referred to as size of single target) based on the TS value of single fish detected by the single fish detection module 20. Calculating fish length of single fish based on TS value being a well known method in the art, further detail is omitted.

The frequency distribution generation module 16 may generate the frequency distribution graph D (refer to FIG. 2) by segmentation of the fish length calculated by the fish length calculation module 15 for each single fish detected by the single fish detection module 20 into fish length intervals.

Figure 6:
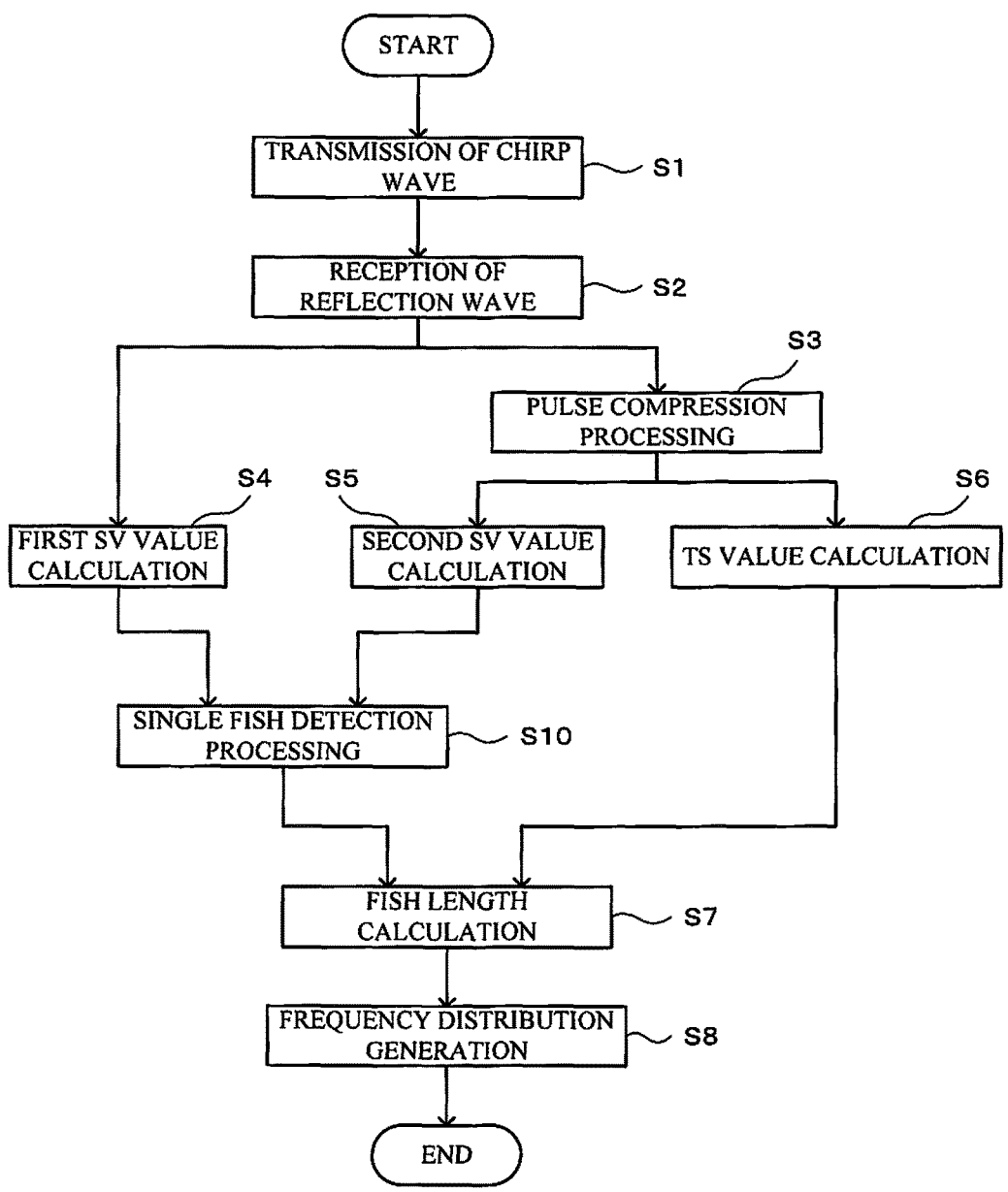
FIG. 6 shows a flow chart of operation of the fish finder shown in FIG. 1.

FIG. 6 shows a flow chart of operation of fish finder 1. Hereinafter, there will be explained, referring to FIG. 6, an operation of fish finder 1.

First, at S1, a chirp wave is transmitted from transducer 2. Then, at S2, the reflection wave returning from said chirp wave reflecting on a target is received by transducer 2.

Next, at S3, the reception signal generated from the reflection wave (i.e., a chirp wave) received by transducer 2 is pulse compressed. As a result, the duration of the reception signal in the depth direction is shortened.

On the other hand, at S4, the first SV value is calculated based on equation (1). S4 can be performed before, after or at the same time as S3.

Once the pulse compression processing S3 is completed, steps S5 and S6 can be performed. At S5, the second SV value is calculated based on equation (1). At S6, the TS value of the pulse compressed signal is calculated for each ping and for each depth position.

Next, at S10, single fish detection is performed based on the first SV value calculated at S4 and the second SV value calculated at S5.

Figure 7:
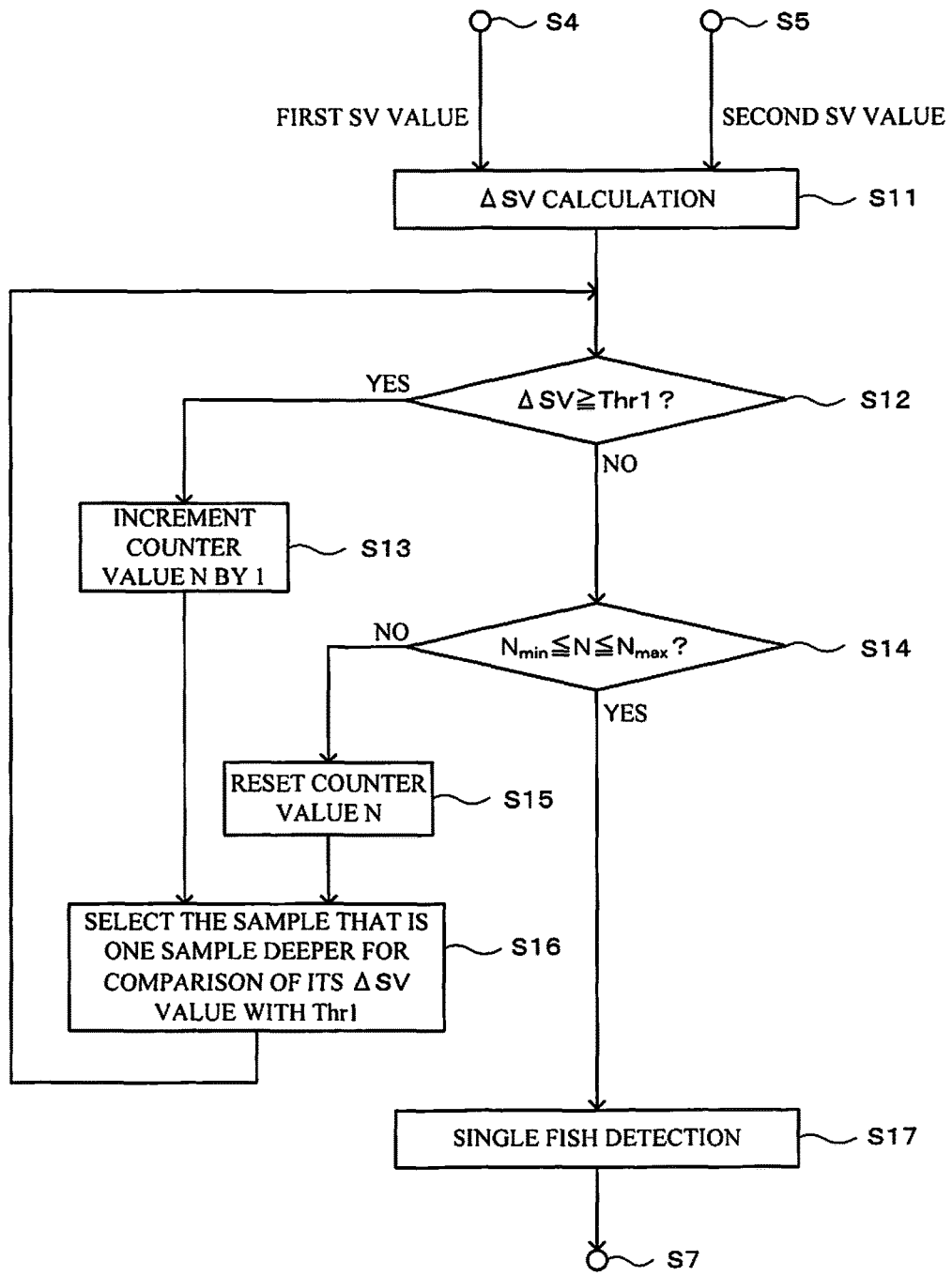
FIG. 7 shows a flow chart illustrating each step involved in step S10 of FIG. 6.

FIG. 7 shows a flow chart illustrating each step involved in S10 (single fish detection processing). At S10, by performing the steps explained below, single fish are more accurately detected that with conventional fish finders.

First, at S11, the ΔSV value is calculated. Specifically, at S11, the ΔSV calculation module 21 calculates the ΔSV value by subtracting the first SV value calculated at S4 from the second SV value calculated at S5. The ΔSV calculation module 21 calculates the ΔSV value for each depth position.

Next, at S12, it is determined whether the ΔSV value is above threshold Thr1.

If the ΔSV value is above threshold Thr1 (S12: YES), the count value N stored at that point in time in counter 22a is incremented by one (S13). Then, the sample that is one sample deeper than the latest sample for which the ΔSV value has been compared with threshold Thr1 is then selected for a comparison of its ΔSV value with Thr1 (S16) and the ΔSV value and Thr1 comparison is once again performed (S12).

On the other hand, if the ΔSV value is below threshold Thr1 (S12: NO), it is determined whether the count value N stored at that point in time in counter 22a is above the lower limit value $N_{min}$ and below the upper limit value $N_{max}$. At initialization time, as the count value N is set to 0, the count value N is below the lower limit value $N_{min}$ (S14: NO) and count value N is reset (S15). Then, the sample that is one sample deeper than the latest sample for which the ΔSV value has been compared with threshold Thr1 is then selected for a comparison of its ΔSV value with Thr1 (S16) and the ΔSV value and Thr1 comparison is once again performed (S12).

Then, after the ΔSV value has to some extent kept above threshold Thr1 in the depth direction for some time (i.e. after the S12, S13, S16 loop has repeated itself to some extent), at S12 when the ΔSV value becomes below threshold Thr1 and at S14 when the count value N is determined as being above the lower limit value $N_{min}$ and below the upper limit value $N_{max}$ (S14: YES), the comparison module 22 determines that the peak waveform is a waveform of a single fish and detects it as a single fish (S17). Then, by performing the above explained single fish detection processing (S10, including steps S11 to S17) to all echo signals returned from the detection area of fish finder 1, all single fish contained in the detection area can be detected.

On the other hand, when the ΔSV value has kept above threshold Thr1 in the depth direction for a too long time (i.e. when the S12, S13, S16 loop has repeated itself too many times), at S12 when the ΔSV value becomes below threshold Thr1, at S14 the count value N is determined as being above the upper limit value $N_{max}$ (S14: NO). In this case, count value N is reset (S15), then the sample that is one sample deeper than the latest sample for which the ΔSV value has been compared with threshold Thr1 is then selected for a comparison of its ΔSV value with Thr1 (S16) and the ΔSV value and Thr1 comparison is once again performed (S12).

Then, when the ΔSV value has kept above threshold Thr1 in the depth direction for a too short time (i.e. when the S12, S13, S16 loop has repeated itself too few times), at S12 when the ΔSV value becomes below threshold Thr1, at S14 the count value N is determined as being below the lower limit value $N_{min}$ (S14: NO). In this case too, as explained in the case above, count value N is reset (S15), then the sample that is one sample deeper than the latest sample for which the ΔSV value has been compared with threshold Thr1 is then selected for a comparison of its ΔSV value with Thr1 (S16) and the ΔSV value and Thr1 comparison is once again performed (S12).

Next, at S7, fish length of all single fish detected at S10 is calculated based on the TS value calculated at S6.

Then, at S8, the fish length calculated at S7 for all single fish detected at S10 is segmented into fish length intervals and the fish length frequency distribution graph D is generated for single fish within the detection area. The frequency distribution graph D generated in this manner is displayed along with the echo image P of the sea on the display screen 4a of the operation/display unit 4 (refer to FIG. 2).

By performing the single fish detection explained above, fish finder 1 of the present embodiment can more accurately detect single fish than conventional fish finders. Hereinafter, the reason is explained.

Figure 8A:
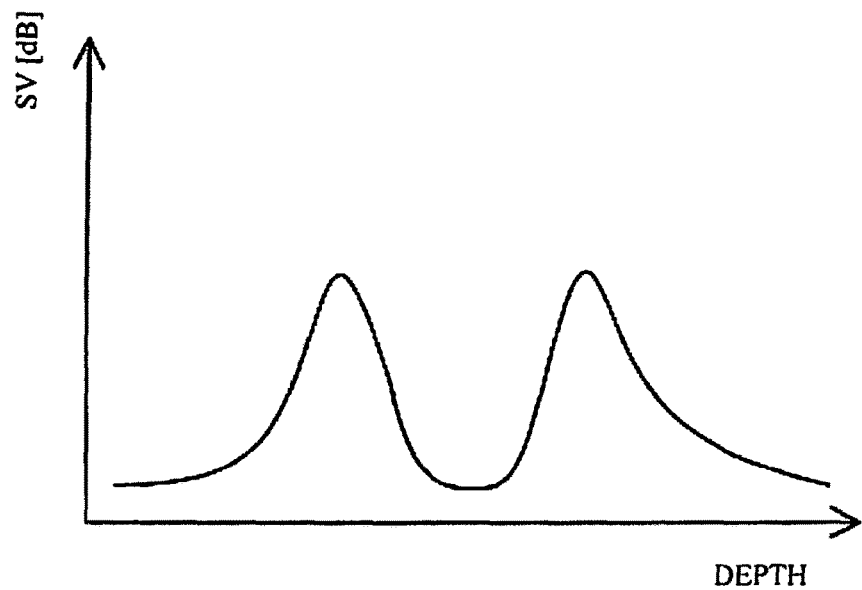
FIGS. 8A and 8B show a second SV value graph, FIG. 8A showing the graph when two single fish are relatively well separated in a depth direction, FIG. 8B showing the graph when two single fish are closer in a depth direction than in FIG. 8A.
Figure 8B:
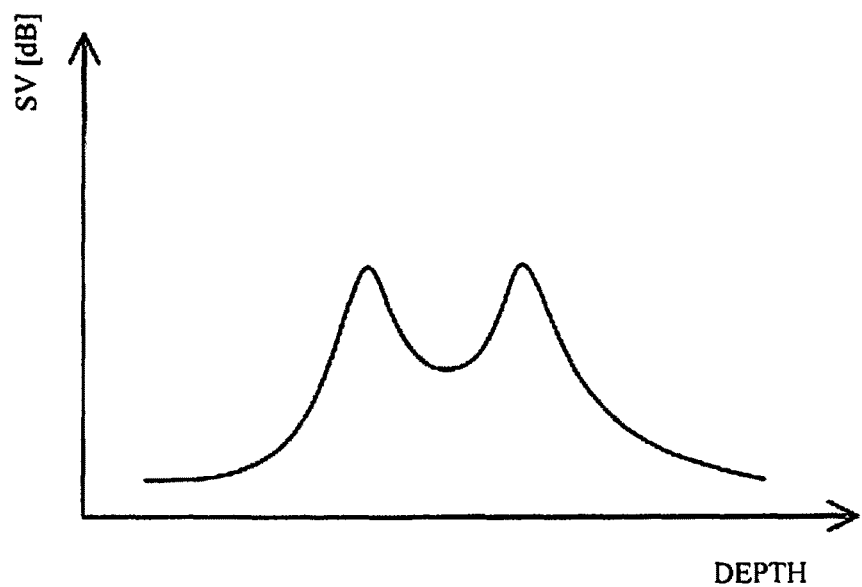

FIGS. 8A and 8B show a second SV value graph. FIG. 8A shows the graph when two single fish are relatively well separated in the depth direction and FIG. 8B shows the graph when two single fish are closer in the depth direction than in FIG. 8A.

A conventional fish finder detects a single fish based on the characteristic of the rising and falling edges of a waveform originating from a single fish. Specifically, a conventional fish finder determines that a waveform originates from a single fish on the condition that the inclination of the rising edge and falling edge of said waveform is sharp. Based on this, as shown for example in FIG. 8A, when the waveforms of two single fish do not mutually interfere, it is determined that both waveforms originate from a single fish. However, when two single fish are closely separated in the depth direction, as shown in FIG. 8B, the rising and falling edges of the waveforms that originate from the fish overlap. As a result, as the characteristic of the rising edge portion and the falling edge portion are altered, accurate single fish detection cannot be performed.

In contrast with conventional fish finders, as explained above fish finder 1 of the present embodiment may detect target (which may also be referred to as single fish) by comparing as first echo intensity a first volume backscattering strength (which may also be referred to as a first SV value) based on the first reception signal and as second echo intensity a second volume backscattering strength (which may also be referred to as a second SV value) based on the second reception signal.

As shown in FIG. 5, the second SV value graph has a relatively high resolution in the depth direction as it is generated based on the pulse compressed reception signal (which may also be referred to as the second reception signal). Therefore, compared to the first SV value graph, the peak waveform of each single fish of the second SV value graph has a thinner width and a higher peak value. Therefore, as explained above, by comparing in the depth direction the value of the first SV value graph and the value of second SV value graph, single fish is detected from the characteristic around the peak of the second SV value graph. Namely, there is no more need to check the rising edge portion and falling edge portion characteristics of each peak waveform of each fish to detect single fish as it has been conventionally done. Therefore, even with densely distributed fish that create peak waveforms with overlapped rising and falling edge portions, each single fish can be accurately detected regardless of said rising and falling edge portion situation.

[Effects]

As in the foregoing, fish finder 1 according to the present embodiment detects single fish based on a comparison of two values (for example the first SV value as the first echo intensity and the second SV value as the second echo intensity) each obtained from two reception signals having mutually different signal durations. With this arrangement, as there is no need to detect single fish based on the characteristic of the rising edge portion and falling edge portion of the peak waveform of each single fish as it has been conventionally done, even when single fish are closely separated in the depth direction, each single fish can be accurately detected.

Accordingly, fish finder 1 can accurately detect target.

In order to have the duration of one of the reception signal (the second reception signal of the present embodiment) to be shorter than the duration of the first reception signal, fish finder 1 may perform pulse compression processing. Accordingly, in order to make the duration of the second reception signal shorter than the first reception signal, there is no need for example to generate two different transmission waves having two different pulse widths. Namely, as there is no need to generate a plurality of different transmission waves, the arrangement of for example the transmission module 6 is simplified.

Moreover, the single fish detection module 20 of fish finder 1 may detect single fish on a condition that the second SV value is bigger than the first SV value. Accordingly, single fish can be appropriately detected.

Moreover, the single fish detection module 20 of fish finder 1 may detect single fish on a condition that the second SV value is bigger than the first SV value by at least threshold Thr1.

Moreover, fish finder 1 may calculate the echo intensity of each reception signal by compensating for the duration of each reception signal. Accordingly, the first echo intensity and the second echo intensity can be appropriately calculated.

Moreover, fish finder 1 may calculate the echo intensity of each reception signal by compensating for the beam width in which the transmission wave is transmitted by the transducer. Accordingly, a more appropriate first echo intensity and second echo intensity can be calculated.

Moreover, fish finder 1 may calculate the volume backscattering strength as first echo intensity and second echo intensity. Accordingly, the well known volume backscattering strength may be used to calculate the first echo intensity and the second echo intensity.

Moreover, fish finder 1 may detect single fish or single aquatic species as single target of interest and estimate quantity.

Moreover, fish finder 1 may calculate fish length of single fish based on the TS value of said single fish. Accordingly, fish length of single fish can be appropriately calculated.

Moreover, fish finder 1 may detect single fish on a condition that the ΔSV value keeps above threshold Thr1 in the depth direction continuously for at least a given number of times (i.e. lower limit value $N_{min}$). Accordingly, false detection of ΔSV value as single fish due to a sudden increase of the ΔSV value not related to single fish echo can be prevented.

Moreover, fish finder 1 may detect single fish on a condition that the ΔSV value keeps above threshold Thr1 in the depth direction continuously for at the most a given number of times (i.e. upper limit value $N_{max}$). Accordingly, false detection of gently-sloping waveform as single fish can be prevented.

[Modifications]

In the foregoing, an embodiment of the present disclosure has been explained. Other embodiments thereof will be explained.

Figure 9:
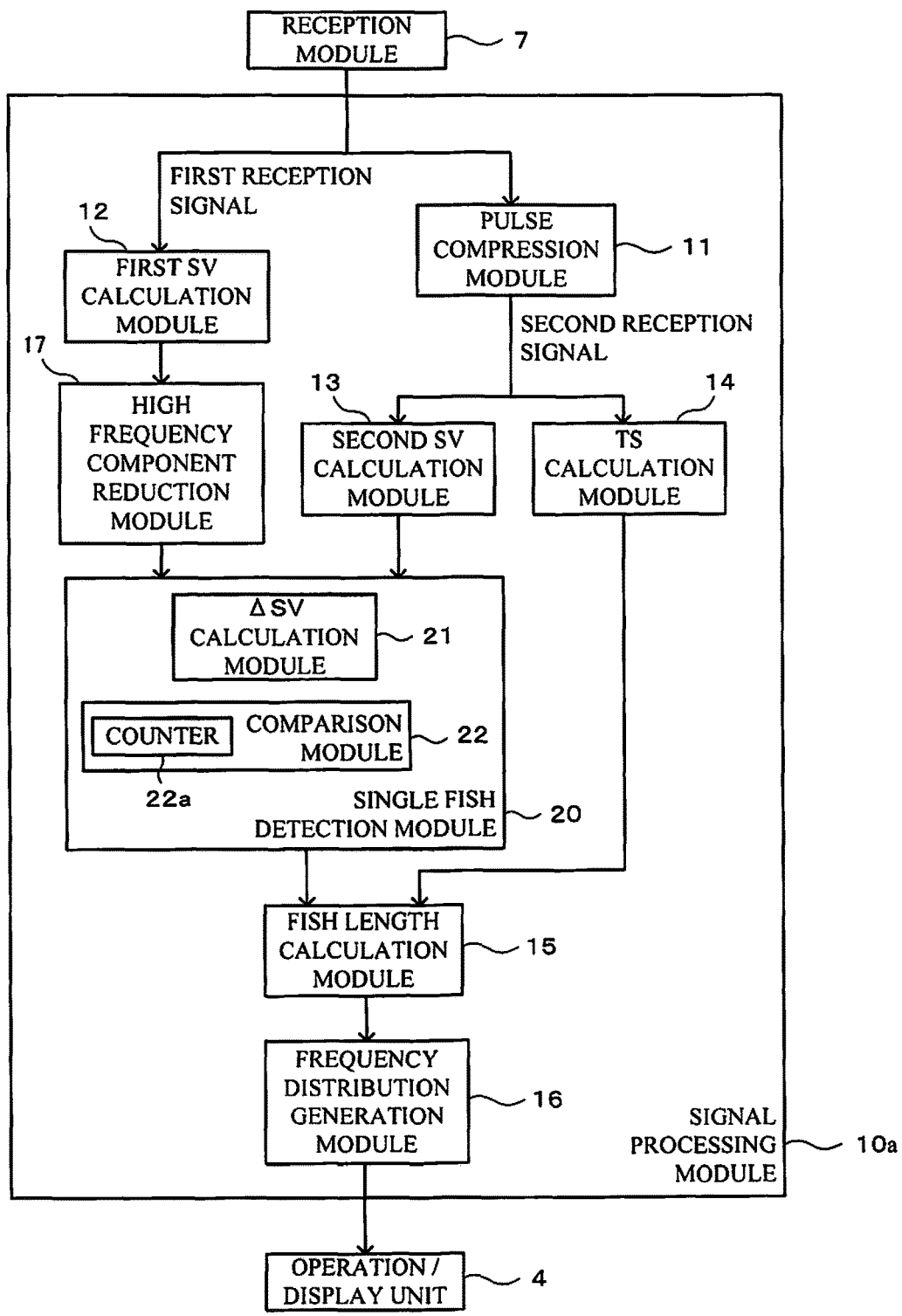
FIG. 9 shows a block diagram of an arrangement of a signal processing module of a fish finder according to another embodiment of the present disclosure.

(1) FIG. 9 shows a block diagram of an arrangement of a signal processing module 10a of a fish finder according to another embodiment. The fish finder of the present embodiment having a high frequency component reduction module 17 is different from fish finder 1 of the foregoing embodiment. Hereinafter, differences with fish finder 1 of the foregoing embodiment will be mainly explained, other explanations will be omitted.

Figure 10:
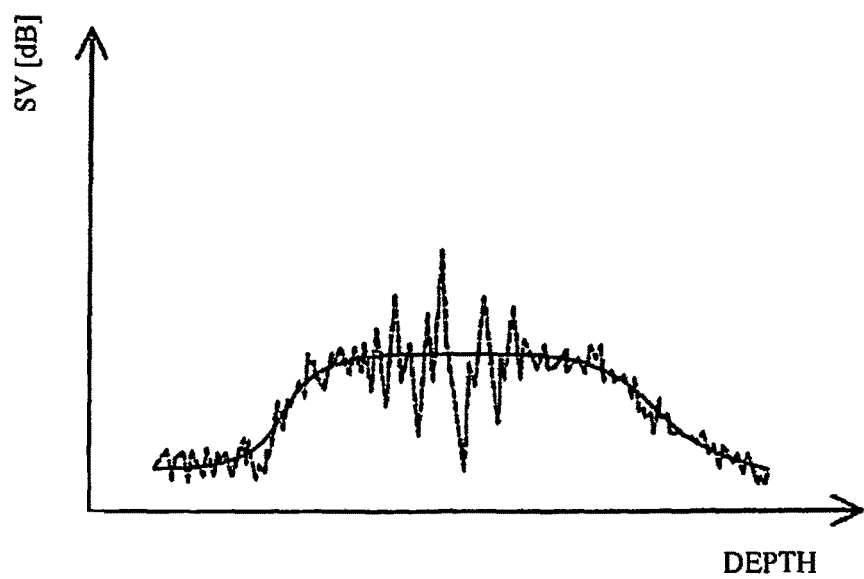
FIG. 10 shows first SV value graphs, the waveform shown in a dotted line being a graph before a high frequency component reduction processing is performed, and the waveform shown in a solid line being a graph after a high frequency component reduction processing is performed.

FIG. 10 shows graphs showing an example of variation of the first SV value with depth. The waveform in the dotted line shows a graph before high frequency component reduction is performed by the high frequency component reduction module 17, and the waveform in the solid line shows a graph after high frequency component reduction is performed. The graph illustrated in FIG. 10 shows a situation where two single fish are closely separated in the depth direction and the rising edge portion and the falling edge portion of the two graphs are overlapping. Then, as the two graphs (which may also be referred to as waveforms) are overlapping, they are mutually interfering with each other and as shown with the dotted line of FIG. 10 the first SV values are highly fluctuating in the overlapping area. In such case, as the result of the comparison of said first SV value with the second SV value differs from desired result, in some cases comparison cannot be accurately performed and therefore single fish detection cannot be accurately performed.

As a countermeasure, the signal processing module 10a of the fish finder of the present embodiment may perform with the high frequency component reduction module 17 a high frequency component reduction of the first SV value in the depth direction. With such measure, the high fluctuations of the first SV value explained above are smoothed and a graph as shown with the solid line of FIG. 10 can be obtained. As a result, as an appropriate first SV value graph with high fluctuation removed can be obtained, single fish can be more accurately detected.

Furthermore, as noise of the first SV value graph can also be reduced with the high frequency component reduction module 17 of the signal processing module 10a of the present embodiment, single fish can be detected more accurately.

Moreover, the signal processing 10a of the present embodiment may perform moving average processing as a processing to reduce high frequency components of the first SV value. As a result, the high frequency components of the first SV value can be appropriately reduced.

Figure 11:
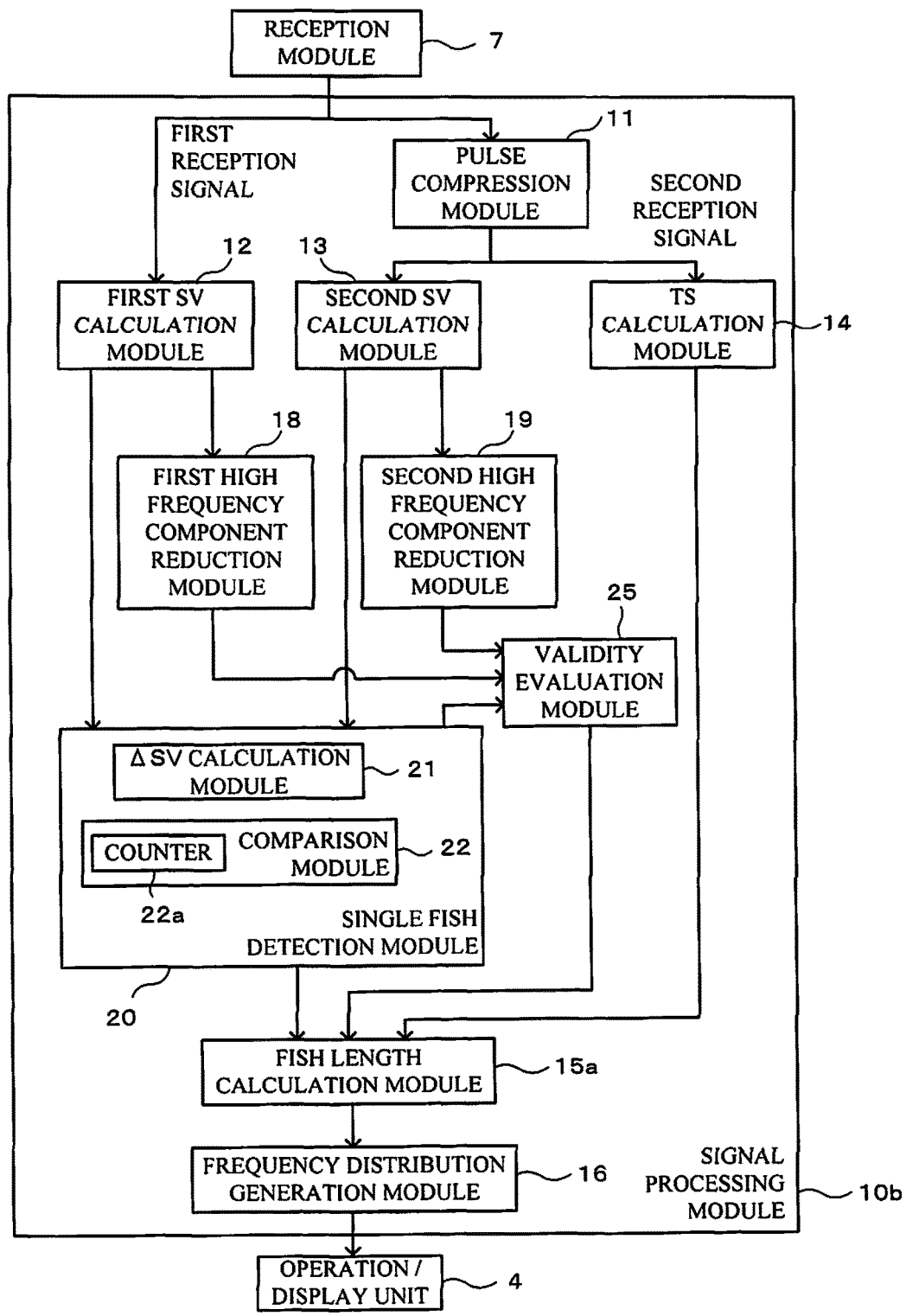
FIG. 11 shows a block diagram of an arrangement of a signal processing module of a fish finder according to another embodiment of the present disclosure.

(2) FIG. 11 shows a block diagram of an arrangement of a signal processing module 10b of a fish finder according to another embodiment of the present disclosure. As will be explained in detail later, the fish finder of the present embodiment is arranged to determine the validity of the detection result from the single fish detection module 20 for each detected single fish and to generate the frequency distribution graph D with only the single fish whose detection result is determined as valid. Namely, the fish finder of the present embodiment eliminates from the frequency distribution graph D single fish whose detection result is not determined as valid. As a result, a frequency distribution graph that uses only single fish data with a high degree of accuracy can be generated.

The fish finder of the present embodiment having a first high frequency component reduction module 18, a second high frequency component reduction module 19 and a validity evaluation module 25 is different from fish finder 1 of the foregoing embodiment. Moreover, a fish length calculation module 15a of the present embodiment and the fish length calculation module 15 of the foregoing embodiment have also operations that slightly differ. Hereinafter, differences with fish finder 1 of the foregoing embodiment will be mainly explained, other explanations will be omitted.

The first high frequency component reduction module 18 may perform a high frequency component reduction of the first SV value in the depth direction in the same way as the high frequency component reduction module 17 of the fish finder shown in FIG. 9. Specifically, as performed by the high frequency component reduction module 17 shown in FIG. 9, the first high frequency component reduction module 18 may perform moving average processing to reduce high frequency components of the first SV value. Note that the lower limit of the frequency that can be reduced by the first high frequency component reduction module 18 of the present embodiment is set so that it is lower than the lower limit of the frequency that can be reduced by the high frequency component reduction module 17 shown in FIG. 9.

The second high frequency component reduction module 19 may perform a high frequency component reduction of the second SV value in the depth direction. Specifically, as performed by the first high frequency component reduction module 18, the second high frequency component reduction module 19 may perform moving average processing.

The validity evaluation module 25 is arranged to evaluate the validity of the single fish detection result from the single fish detection module 20. Specifically, the validity evaluation module 25 may evaluate the validity of the detection result of the single fish detection module 20 based on a comparison result of the first SV value graph processed by moving averaging by the first high frequency component reduction module 18 and the second SV value graph processed by moving averaging by the second high frequency component reduction module 19.

Figure 12A:
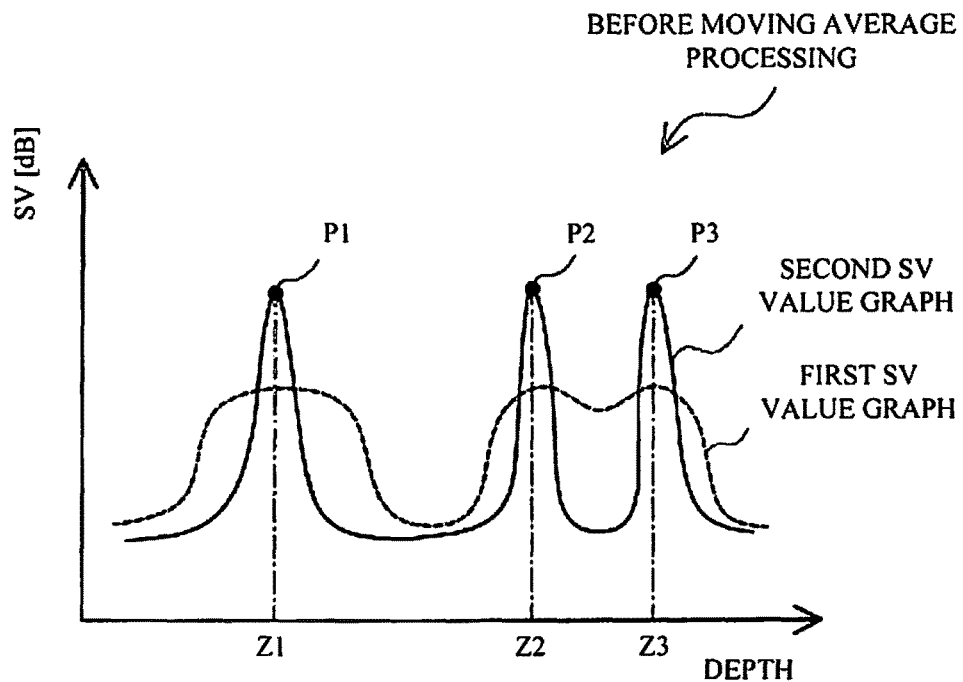
FIGS. 12A and 12B show first SV value graph and second SV value graph when a plurality of single fish are relatively well separated in a depth direction, the waveform shown in a dotted line being the first SV value graph, and the waveform shown in a solid line being the second SV value graph.
Figure 12B:
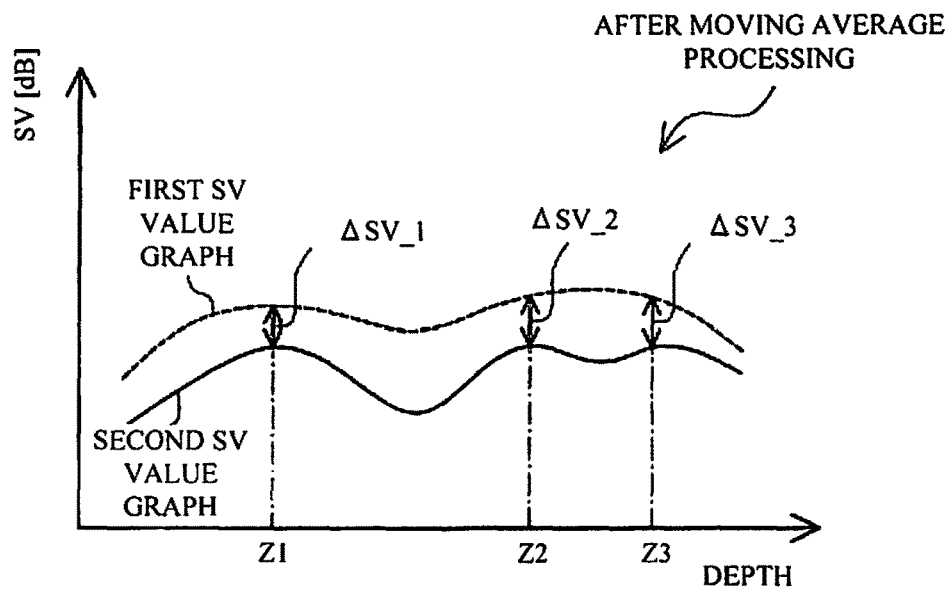

FIGS. 12A and 12B show the first SV value graph and the second SV value graph on top of each other when a plurality of single fish are relatively well separated in the depth direction, the waveform shown in a dotted line being the first SV value graph, and the waveform shown in a solid line being the second SV value graph. FIG. 12A shows the waveforms before high frequency component reduction processing and FIG. 12B shows the waveforms after high frequency component reduction processing.

Using FIGS. 12A and 12B for explanation purposes, the validity evaluation module 25 compares the first SV value processed by moving averaging and the second SV value processed by moving averaging at each depth position Z1 to Z3 where peaks P1 to P3 have been estimated as single fish waveforms by the single fish detection module 20. Specifically, the validity evaluation module 25 subtracts the second SV value processed by moving averaging from the first SV value processed by moving averaging at depth positions Z1 to Z3 that correspond to single fish waveform peaks P1 to P3. Then, the validity evaluation module 25 determines whether each subtraction value $\Delta SV\_1$ to $\Delta SV\_3$ is above a given threshold Thr2. If the subtraction value is above Thr2, the validity evaluation module 25 determines that the detection result that detected single fish at depth positions Z1 to Z3 is valid and notifies the verification result to the fish length calculation module 15a. On the other hand, if the subtraction value is below Thr2, the validity evaluation module 25 determines that the detection result that detected single fish at depth positions Z1 to Z3 is not valid and notifies the verification result to the fish length calculation module 15a.

Among the single fish detected by the single fish detection module 20, the fish length calculation module 15a may calculate only the fish length of single fish whose detection result has been determined as valid by the validity evaluation module 25. Namely, the fish length calculation module 15a may not calculate the fish length of single fish whose detection result has not been determined as valid by the validity evaluation module 25.

The frequency distribution generation module 16 may generate the frequency distribution graph by segmentation of the fish length calculated by the fish length calculation module 15a for each single fish. Namely, the frequency distribution generation module 16 may generate the frequency distribution graph by only considering the detected single fish whose detection result has been determined as valid.

As explained above, the validity evaluation module 25 may evaluate the validity of the detection result of the single fish detection module 20 based on first and second SV values processed by high frequency component reduction processing (moving average in the present embodiment). Hereinafter, FIGS. 12A, 12B, 13A and 13B are used to explain the validity evaluation of the current method.

As shown in FIG. 12A, when a plurality of fish are relatively well separated in the depth direction, the mutual interference of each waveform being relatively small, the single fish detection of the single fish detection module 20 can be relatively accurately performed. Also, when such a plurality of fish are relatively well separated in the depth direction, it can be seen as a characteristic of the first SV graph and second SV graph that there are relatively fewer high fluctuations in the depth direction. In this case, the differences $\Delta SV\_1$ to $\Delta SV\_3$ between the first SV value processed by moving averaging and the second SV value processed by moving averaging become relatively bigger.

Figure 13A:
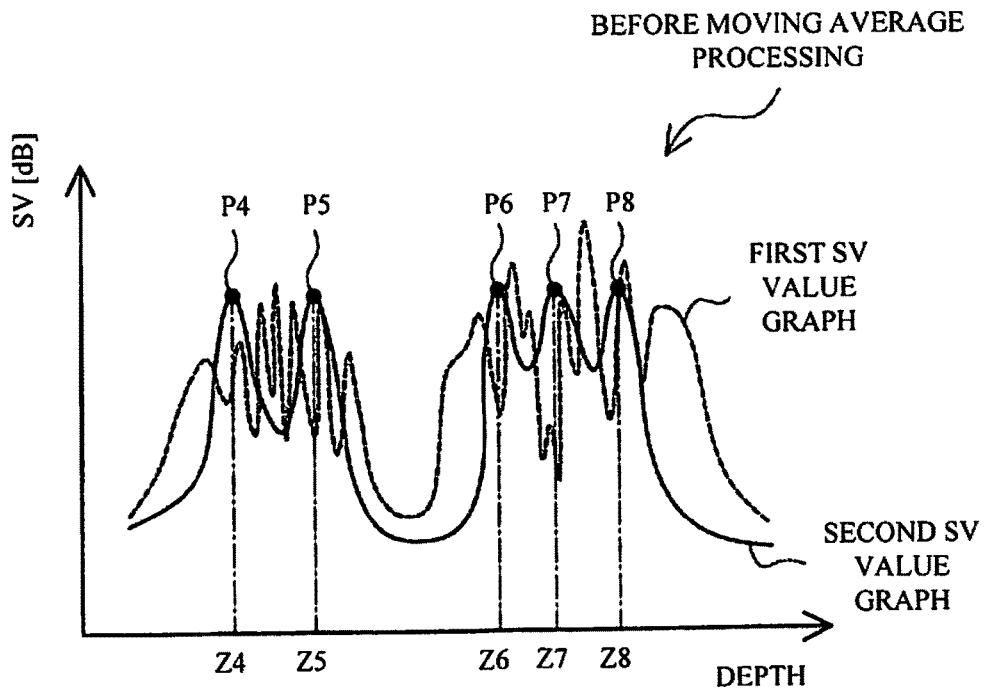
FIGS. 13A and 13B show first SV value graph and second SV value graph when a plurality of single fish are relatively closely separated in a depth direction, the waveform shown in a dotted line being the first SV value graph, and the waveform shown in a solid line being the second SV value graph.
Figure 13B:
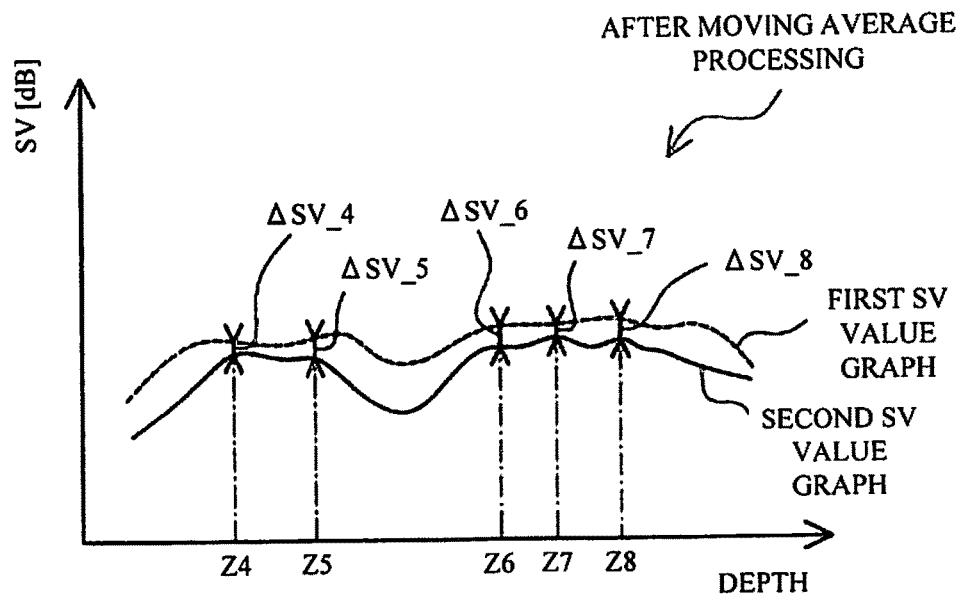

On the other hand, as shown in FIG. 13A, when a plurality of fish are relatively closely separated in the depth direction, the mutual interference of each waveform being relatively big, the single fish detection of the single fish detection module 20 cannot be accurately performed in some cases. Also, when such a plurality of fish are relatively closely separated in the depth direction, it can be seen as a characteristic of the first SV graph and second SV graph that there are relatively bigger fluctuations in the depth direction. In this case, the differences $\Delta SV\_4$ to $\Delta SV\_8$ between the first SV value processed by moving averaging and the second SV value processed by moving averaging become relatively smaller.

Namely, with the validity evaluation module 25 of the present embodiment, $\Delta SV\_1$ to $\Delta SV\_8$ values are calculated for each peak waveform of single fish and by comparing those values to threshold Thr2 the validity of the detection result of the single fish detection module 20 can be appropriately evaluated.

Note that in the present embodiment, the frequency distribution graph is generated by only considering single fish data whose detection result has been determined as valid by the validity evaluation module 25, but this should not be a limitation. Specifically, as an example, the display can switch between a frequency distribution graph generated with all detected single fish data (i.e., a total frequency distribution graph) and a frequency distribution graph generated only with single fish data whose detection result has been determined as valid (i.e., a frequency distribution graph after validity evaluation). The total frequency distribution graph and the frequency distribution graph after validity evaluation explained above can also be displayed simultaneously.

(3) In fish finder 1 of the foregoing embodiment, threshold Thr1 is a constant value, but this should not be a limitation. Specifically, as an example, the fish finder according to the embodiment shown in FIG. 11 can calculate an index value representative of fish school density from the result of the validity evaluation module 25, and threshold Thr1 value can be set based on said index value. Accordingly, threshold Thr1 can be set appropriately according to fish density.

Figure 14:
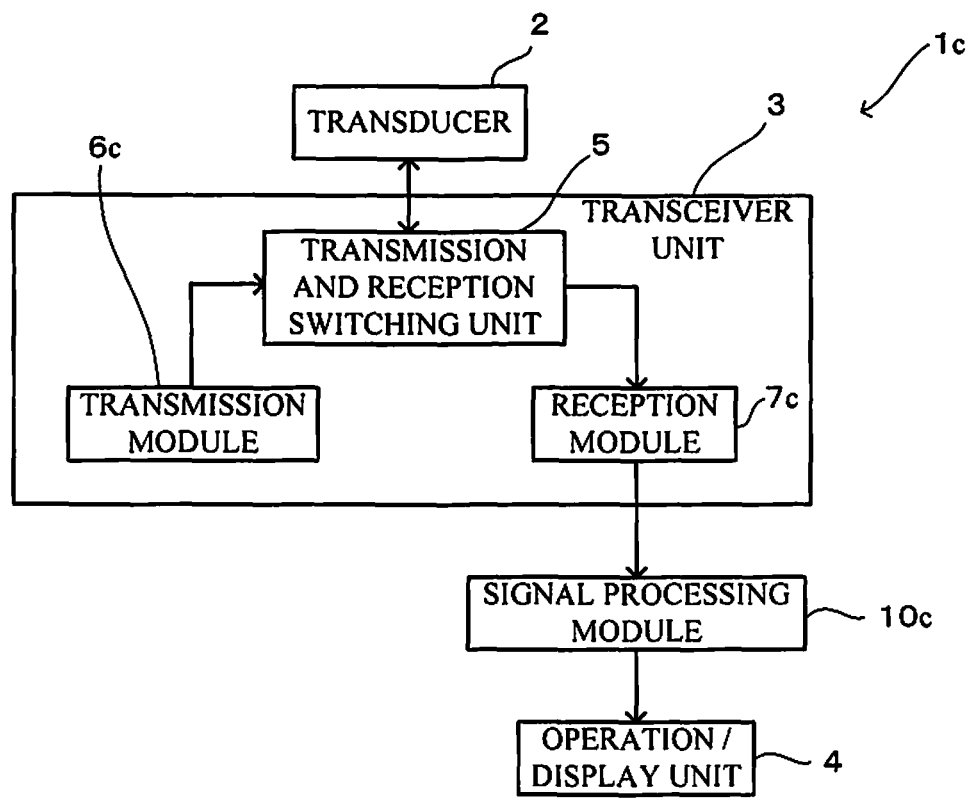
FIG. 14 shows a block diagram of an arrangement of a fish finder according to another embodiment of the present disclosure.

(4) FIG. 14 shows a block diagram of an arrangement of a fish finder 1c according to another embodiment of the present disclosure. Compared to fish finder 1 of the foregoing embodiment, a transmission module 6c, a reception module 7c and a signal processing module 10c of fish finder 1c according to the present embodiment have different arrangements. Hereinafter, differences with fish finder 1 of the foregoing embodiment will be mainly explained, other explanations will be omitted.

Transmission module 6c according to the present embodiment may supply in alternation two transmission signals of mutually different pulse widths to transducer 2 so that two pulse waves (which may also be referred to as a first ultrasonic wave and a second ultrasonic wave) of mutually different pulse widths are transmitted from transducer 2. Accordingly, first ultrasonic wave and second ultrasonic wave having mutually different pulse widths may be alternately transmitted from transducer 2. In the present embodiment, the pulse width of the second ultrasonic wave is set to be shorter that the pulse width of the first ultrasonic wave. Transducer 2 alternates between transmission/reception of the first ultrasonic wave and transmission/reception of the second ultrasonic wave. Note that, the frequency of the first ultrasonic wave and the second ultrasonic wave can be made identical or can be made mutually different.

The reception module 7c may amplify the signal obtained from a reception wave being received by transducer 2, perform an Analog to Digital conversion of the amplified reception signal, and supply the converted digital reception signal to the signal processing module 10c, in the same way as it is done in the foregoing embodiment explained above. The reception module 7c according to the present embodiment may then output the reception signal (which may also be referred to as the first reception signal) obtained from a reflection wave of the first ultrasonic wave to the first SV calculation module 12 and output the reception signal (which may also be referred to as the second reception signal) obtained from a reflection wave of the second ultrasonic wave to the second SV calculation module 13 and to the TS calculation module 14.

Figure 15:
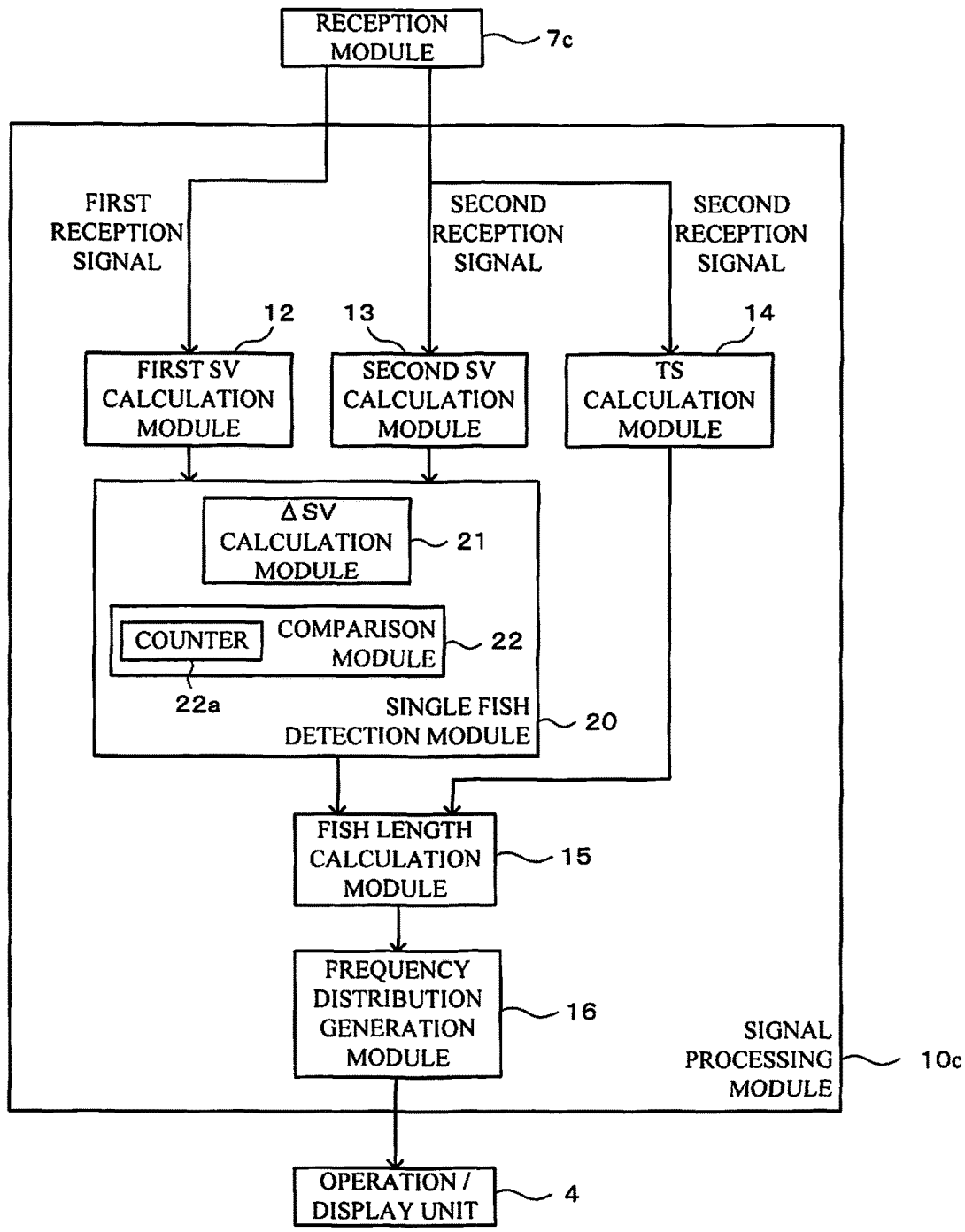
FIG. 15 shows a block diagram of an arrangement of the signal processing module shown in FIG. 14.

FIG. 15 shows a block diagram of an arrangement of signal processing module 10c of fish finder 1c according to the present embodiment. In signal processing module 10c according to the present embodiment, the pulse compression module is omitted compared to signal processing module 10 according to the foregoing embodiment. In signal processing module 10c according to the present embodiment, on one hand the first SV calculation module 12 may calculate the first SV value based on a first reception signal whose signal duration is relatively long, and on the other hand the second SV calculation module 13 may calculate the second SV value based on a second reception signal whose signal duration is shorter than the first reception signal. The TS calculation module 14 may also calculate based on the second reception signal the TS value of the reflection wave returned from each depth position.

Therefore, as it is done in fish finder 1 of the foregoing embodiment, with fish finder 1c of the present embodiment reception signals having mutually different signal durations can be each inputted to the first SV calculation module 12 and the second SV calculation module 13. Therefore, as with fish finder 1 of the foregoing embodiment, with fish finder 1c of the present embodiment single target can be accurately detected.

Note that, in the present embodiment, the transmission module and the transducer can be arranged so that the first ultrasonic wave and the second ultrasonic wave are transmitted simultaneously. In this case, the frequency of the first ultrasonic wave and the second ultrasonic wave need to be set to mutually different frequency values so that the ultrasonic waves are mutually separable.

(5) In fish finder 1 of the foregoing embodiment, pulse compression module 11 has been used to shorten the signal duration of the reception signal, but this should not be a limitation. Specifically, inverse filtering, adaptive beamforming or other methods to compress the signal duration of the reception signal can be used.

(6) In the fish finder of the embodiment shown in FIG. 9, as high frequency component reduction processing performed by the high frequency component reduction module 17 moving average processing has been used as an example but this should not be a limitation, other processing such as low pass filtering to reduce high frequency components can be performed. Similarly, in the fish finder of the embodiment shown in FIG. 11, as high frequency component reduction processing performed by the first high frequency component reduction module 18 and the second high frequency component reduction module 19 moving average processing has been used as an example but this should not be a limitation, other processing such as low pass filtering explained above to reduce high frequency components can be performed.

(7) In the fish finder of the foregoing embodiment and the fish finders of the other embodiments above, the signal processing module can be used for example as an abnormal value detection module (illustration omitted). The abnormal value detection module may compare the $\Delta SV$ value with a given threshold and when said $\Delta SV$ value is above the threshold, said $\Delta SV$ value is not considered when single fish detection is performed. In this case, said threshold is set to a value so that inappropriate $\Delta SV$ value can be removed. As a result, by not considering abnormal $\Delta SV$ value when performing single fish detection, a more accurate single fish detection can be performed.

Figure 16:
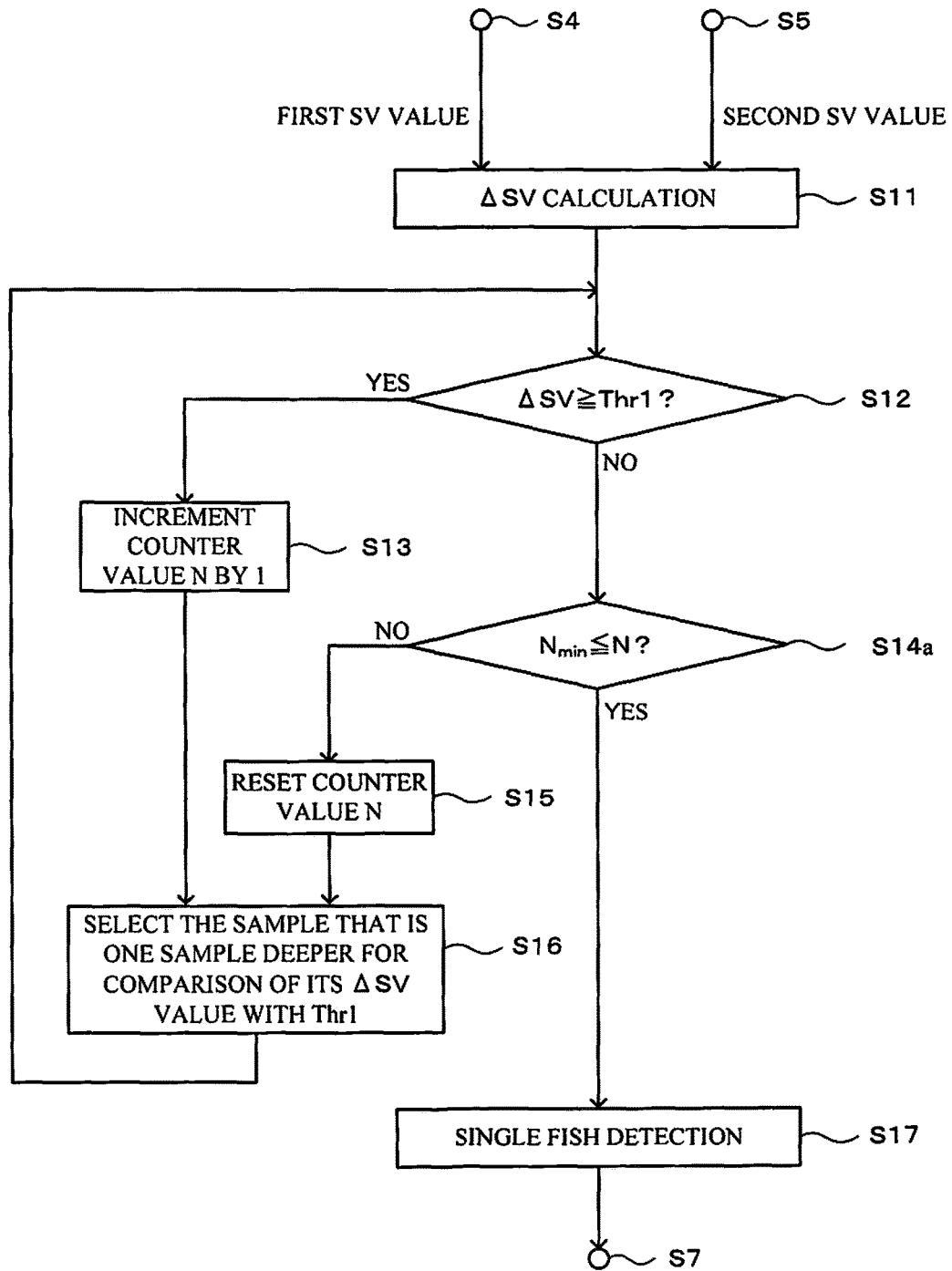
FIG. 16 shows a flow chart of operation of a fish finder according to another embodiment of the present disclosure.

(8) FIG. 16 shows a flow chart of operation of a fish finder according to another embodiment. In the foregoing embodiment, as shown in S14 of FIG. 7, when the $\Delta SV$ value keeps above threshold Thr1 in the depth direction continuously for at least a given number of times (i.e., lower limit value $N_{min}$) and for at the most a given number of times (i.e., upper limit value $N_{max}$), a single fish is detected based on the waveform, but this should not be a limitation. Specifically, as shown in S14a of FIG. 16, when the $\Delta SV$ value keeps above threshold Thr1 in the depth direction continuously for at least a given number of times (i.e., lower limit value $N_{min}$), a single fish can be detected based on the waveform.

(9) In the foregoing embodiment and other embodiments, as an example of detection apparatus a fish finder has been explained but this should not be a limitation; it can be applied to a radar apparatus.

Figure 17:
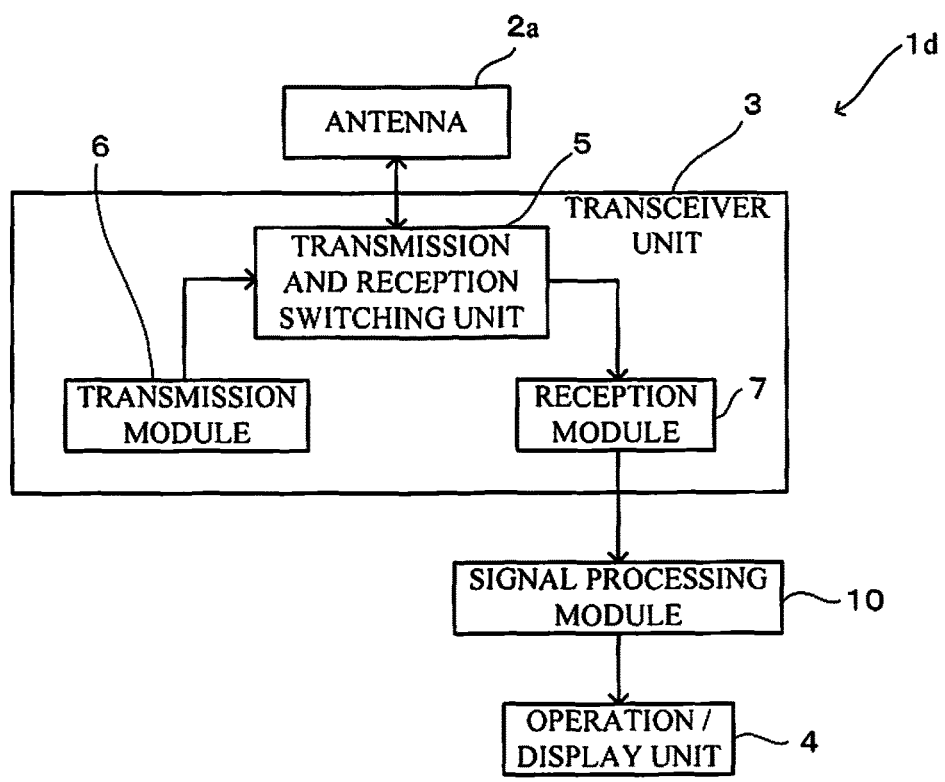
FIG. 17 shows a block diagram of an arrangement of a radar according to another embodiment of the present disclosure.

FIG. 17 shows a block diagram of an arrangement of a radar apparatus 1d according to another embodiment of the present disclosure. Radar apparatus 1d may be used to detect target above sea level (for example other vessels). Radar apparatus 1d may be for example installed on a ship such as a fishing vessel.

Hereinafter, differences of radar apparatus 1d with fish finder 1 of the foregoing embodiment will be mainly explained. Arrangements similar or identical to those in fish finder 1 are referred to in the drawings with the same reference numerals and the detailed description thereof is omitted.

As shown in FIG. 17, radar apparatus 1d is comprised of an antenna 2a, transceiver unit 3, signal processing module 10 and operation/display unit 4.

Antenna 2a may be for example installed on a vessel and used to transmit and receive electromagnetic waves. Antenna 2a of the present embodiment may operate both as a transmitting element array and a receiving element array. Antenna 2a comprises a plurality of antenna elements (illustration omitted) operated both as transmitting elements and receiving elements. Said antenna elements are for example linearly arranged. However, such arrangement should not be a limitation; antenna elements can be 2 dimensionally or 3 dimensionally arranged.

Apart from the fact that the transmission and reception waves are electromagnetic waves and that other vessel or aircraft are single targets to be detected, transceiver unit 3, signal processing module 10 and operation/display unit 4 of radar apparatus 1d operate in the same way as in fish finder 1 of the foregoing embodiment.

For example, when it rains, when a conventional radar detects targets such as other vessel, it happens that single target cannot accurately be detected due to rain. However, with the radar apparatus 1d of the present embodiment single target can be detected without being affected by rain.

Therefore, as fish finder 1 of the foregoing embodiment, the radar apparatus 1*d* can accurately detect single target.

(10) In the foregoing embodiment, a chirp wave is transmitted from transducer 2 but it should not a limitation as other waveforms can also be used.

(11) In the foregoing embodiment, volume backscattering strength is used as first echo intensity and second echo intensity, but this should not be a limitation. Specifically, echo intensity can be calculated for example by compensating for the duration of the reception signal or by compensating for the beam width in which the transmission wave is transmitted by the transducer.

Figure 18:
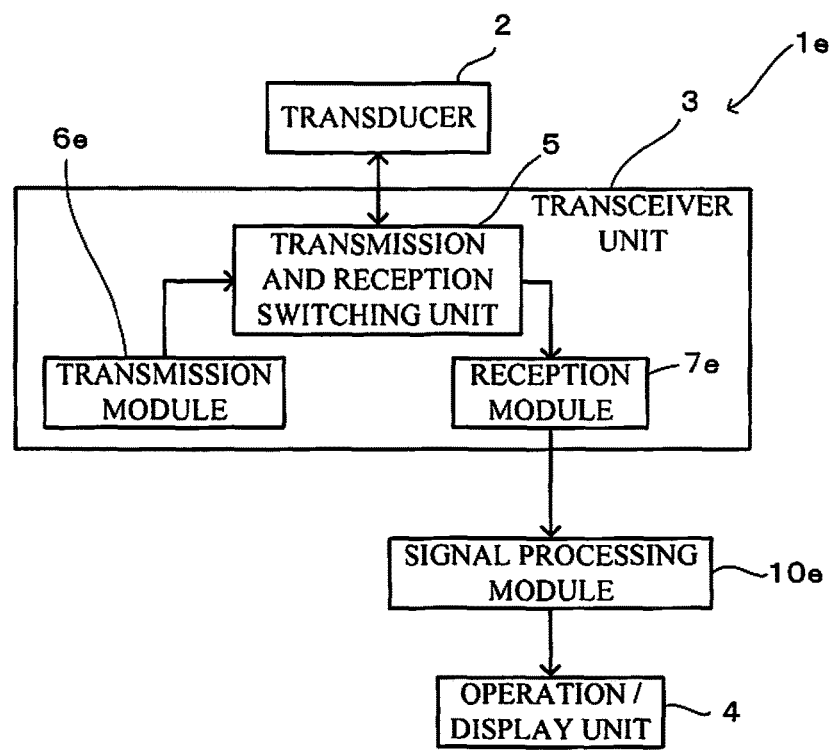
FIG. 18 shows a block diagram of an arrangement of a fish finder according to another embodiment of the present disclosure.
Figure 19:
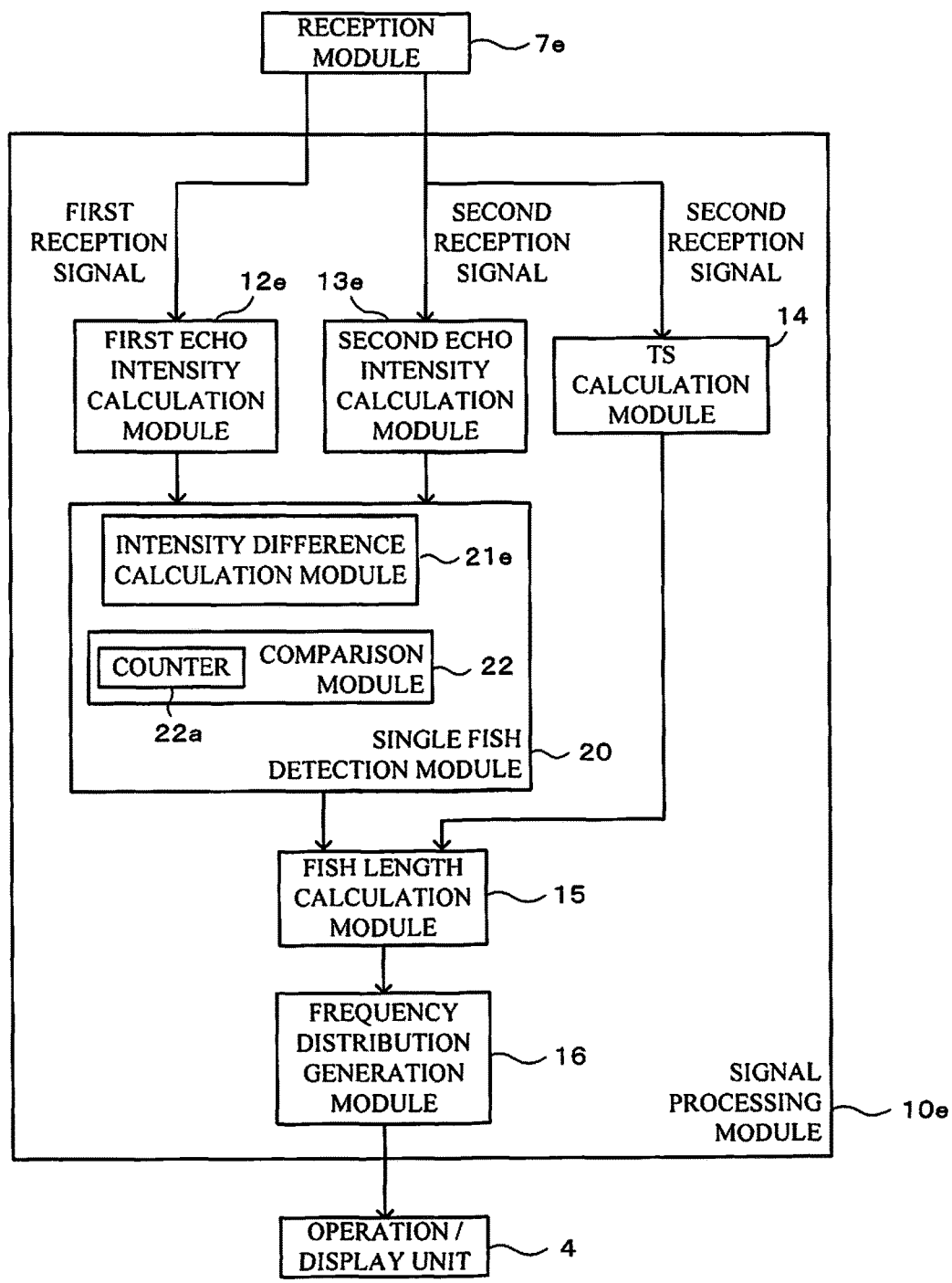
FIG. 19 shows a block diagram of an arrangement of a signal processing module of the fish finder shown in FIG. 18.

(12) FIG. 18 shows a block diagram of an arrangement of a fish finder 1*e* according to another embodiment of the present disclosure. Moreover, FIG. 19 shows a block diagram of an arrangement of a signal processing module 10*e* of the fish finder 1*e* shown in FIG. 18. Compared to the arrangements of the fish finder 1*c* shown in FIG. 14, the arrangement of transmission module 6*e*, reception module 7*e* and signal processing module 10*e* of the fish finder 1*e* according to the present embodiment differ. Hereinafter, differences with fish finder 1*c* shown in FIG. 14 will be explained, other explanations will be omitted.

Transmission module 6*e* may supply in alternation two transmission signals of mutually different frequencies to transducer 2 so that two pulse waves (which may also be referred to as a first transmission wave and a second transmission wave) of mutually different beam widths are transmitted from transducer 2. Accordingly, first ultrasonic wave (which may also be referred to as first transmission wave) and second ultrasonic wave (which may also be referred to as second transmission wave) having mutually different beam widths are alternately transmitted from transducer 2. In the present embodiment, the beam width of the second ultrasonic wave is set to be smaller than the beam width of the first ultrasonic wave. Transducer 2 alternates between transmission/reception of the first ultrasonic wave and transmission/reception of the second ultrasonic wave.

The reception module 7*e* may amplify the signal obtained from a reception wave being received by transducer 2, perform an Analog to Digital conversion of the amplified reception signal, and supply the converted digital reception signal to the signal processing module 10*e*, in the same way as it is done in the foregoing embodiment. The reception module 7*e* according to the present embodiment may then output the reception signal (which may also be referred to as the first reception signal) obtained from a reflection wave of the first ultrasonic wave to a first echo intensity calculation module 12*e* of the signal processing module 10*e* and output the reception signal (which may also be referred to as the second reception signal) obtained from a reflection wave of the second ultrasonic wave to a second echo intensity calculation module 13*e* of the signal processing module 10*e*.

The signal processing 10*e* may be arranged so that the first SV calculation module 12 of the signal processing module 10*c* shown in FIG. 15 is replaced by the first echo intensity calculation module 12*e*, the second SV calculation module 13 is replaced by the second echo intensity calculation module 13*e*, and *t* SV calculation module 21 is replaced by the intensity difference calculation module 21*e*. The first echo intensity calculation module 12*e* may use the echo intensity of the first reception signal compensated with the beam width of the first ultrasonic wave as the first echo intensity. The second echo intensity calculation module 13*e* may use the echo intensity of the second reception signal compensated with the beam width of the second ultrasonic wave as the second echo intensity. The intensity difference calculation module 21*e* may calculate for each depth position a difference between the first echo intensity and the second echo intensity (which may also be referred to as an intensity difference). Specifically, the intensity difference calculation module 21*e* may calculate the intensity difference by subtracting the first echo intensity from the second echo intensity for each depth position.

As in the foregoing embodiment, the comparison module 22 of the signal processing module 10*e* of the present embodiment may detect single fish based on a comparison result of the intensity difference calculated by the intensity difference calculation module 21*e* with a given threshold, and a count value counted by counter 22*a* of said comparison module 22. As the remaining processing of signal processing module 10*e* is identical to the foregoing embodiment, explanation is omitted.

As fish finder 1 of the foregoing embodiment, fish finder 1*e* of the present embodiment can accurately detect single fish (which may also be referred to as target).

Moreover, fish finder 1*e* may calculate the echo intensity of each reception signal by compensating for the beam width of each transmission signal. Accordingly, the first echo intensity and the second echo intensity can be appropriately calculated.

Note that in the present embodiment, the echo intensity of the first reception signal compensated with the beam width of the first ultrasonic wave is used as the first echo intensity, and the echo intensity of the second reception signal compensated with the beam width of the second ultrasonic wave is used as the second echo intensity. However, without any limitation to this, the echo intensity of the first reception signal compensated with a duration of the first reception signal can be used as the first echo intensity, and the echo intensity of the second reception signal compensated with a duration of the second reception signal can be used as the second echo intensity. Still without any limitation to this, volume backscattering strength can be used as the first echo intensity and the second echo intensity.

Moreover, in the present embodiment, in order to form two transmission waves having mutually different beam widths, transmission waves having mutually different frequencies are formed but this should not be a limitation. Specifically, as an example, it is possible to adjust the beam width of the transmission wave transmitted by each transducer by having transducers with mutually different shapes or transducers containing mutually a different number of ultrasonic elements, or transducers containing an ultrasonic element of mutually different size.

Moreover, in the present embodiment, transducer 2 transmits in alternation and repeatedly first transmission wave and second transmission wave, but this should not be a limitation as it is possible to simultaneously transmit first and second transmission waves. In this case, the frequency of the first transmission wave and the frequency of the second transmission wave need to be set to mutually different frequencies.

(13) In the foregoing embodiment, when calculating the echo intensity using equation (1), as an approximation, the length of the first reception signal is set to the duration of the transmission signal (for example the chirp signal) generated by the transmission module, and as an approximation, the length of the second reflection signal is set to the duration the chirp signal generated by the transmission module would have after being compressed by the pulse compression module, but it should not be a limitation. Without performing any approximation, the actual length of each reception signal can be measured. For example, the length of each reception signal can be simply measured by calculating the time difference between the rising and falling edges of the reception signal.

TERMINOLOGY

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A detection apparatus, comprising:
a transducer configured to transmit a first transmission wave and a second transmission wave, a pulse width of the second transmission wave being shorter than that of the first transmission wave; and
a hardware processor programmed to:
calculate a first echo intensity of a first reception signal generated from a first reception wave resulting from a reflection of the first transmission wave on a reflection object, by compensating for a beam width in which the first transmission wave is transmitted by the transducer,
calculate a second echo intensity of a second reception signal generated from a second reception wave resulting from a reflection of the second transmission wave on the reflection object, by compensating for a beam width in which the second transmission wave is transmitted by the transducer, a signal duration of the second reception signal being shorter than that of the first reception signal, and
detect a target from a comparison of the first echo intensity and the second echo intensity.

2. The detection apparatus of claim 1, wherein
the hardware processor is further programmed to:
detect the target on a condition that the second echo intensity is bigger than the first echo intensity.

3. The detection apparatus of claim 2, wherein
the hardware processor is further programmed to:
detect the target on a condition that the second echo intensity is bigger than the first echo intensity by at least a given value.

4. The detection apparatus of claim 1, wherein
the hardware processor is further programmed to:
calculate the first echo intensity by compensating for the duration of the first reception signal, and
calculate the second echo intensity by compensating for the duration of the second reception signal.

5. The detection apparatus of claim 1, wherein
the hardware processor is further programmed to:
calculate volume backscattering strength of the first reception signal as the first echo intensity, and
calculate volume backscattering strength of the second reception signal as the second echo intensity.

6. The detection apparatus of claim 1, wherein
the hardware processor is further programmed to:
reduce a high frequency component of the first echo intensity, and
compare the first echo intensity from which high frequency component is reduced and the second echo intensity.

7. The detection apparatus of claim 6, wherein
the hardware processor is further programmed to:
reduce the high frequency component of the first echo intensity by performing a moving average of the first echo intensity.

8. The detection apparatus of claim 1, wherein
the hardware processor is further programmed to:
reduce a high frequency component of the first echo intensity,
reduce a high frequency component of the second echo intensity, and
evaluate a validity of the target detection based on a ratio of the first echo intensity from which high frequency component is reduced and the second echo intensity from which high frequency component is reduced.

9. The detection apparatus of claim 1, wherein the target is at least one of a fish school, a single fish or a single aquatic species.

10. The detection apparatus of claim 9, wherein
the hardware processor is further programmed to:
detect a single fish or a single aquatic species as a single target, and
calculate a size of the single target.

11. A radar apparatus comprising the detection apparatus of claim 1.

12. A detection apparatus, comprising:
a transducer configured to transmit a first transmission wave and a second transmission wave, a beam width of the second transmission wave being smaller than that of the first transmission wave; and
a hardware processor programmed to:
calculate a first echo intensity of a first reception signal generated from a reception wave resulting from a reflection of the first transmission wave on a reflection object, by compensating for the beam width of the first transmission wave,
calculate a second echo intensity of a second reception signal generated from a reception wave resulting from a reflection of the second transmission wave on the reflection object, by compensating for the beam width of the second transmission wave, and
detect a target from a comparison of the first echo intensity and the second echo intensity.

13. The detection apparatus of claim 12, wherein
the hardware processor is further programmed to:
calculate the first echo intensity by compensating for a duration of the first reception signal, and
calculate the second echo intensity by compensating for a duration of the second reception signal.

14. A detection method, comprising:
calculating, by a processor, a first echo intensity of a first reception signal generated from a reception wave resulting from a reflection of a transmission wave on a reflection object, by compensating for a beam width in which the transmission wave is transmitted by a transducer;
compressing, by the processor, the first reception signal to generate a second reception signal, a signal duration of the second reception signal being shorter than that of the first reception signal;

calculating, by the processor, a second echo intensity of the second reception signal, by compensating for the beam width; and comparing, by the processor, the first echo intensity and the second echo intensity to detect a target.

15. A detection apparatus, comprising:

a transducer configured to transmit a transmission wave;

a hardware processor programmed to:

calculate a first echo intensity of a first reception signal generated from a reception wave resulting from a reflection of the transmission wave on a reflection object, by compensating for a beam width in which the transmission wave is transmitted by the transducer, compress the first reception signal to generate a second reception signal, a signal duration of the second reception signal being shorter than that of the first reception signal, calculate a second echo intensity of the second reception signal, by compensating for the beam width, and detect a target from a comparison of the first echo intensity and the second echo intensity.

\* \* \* \* \*